United States Patent
Otsuki et al.

(10) Patent No.: US 11,592,202 B2
(45) Date of Patent: Feb. 28, 2023

(54) CONTROL DEVICE AND METHOD FOR CONTROLLING AIR CONDITIONER COMMUNICATIVELY COUPLED TO MULTIPLE USER DEVICES

(71) Applicant: KABUSHIKI KAISHA TOSHIBA, Tokyo (JP)

(72) Inventors: Tomoshi Otsuki, Kawasaki (JP); Kenichi Fujiwara, Kawasaki (JP); Miho Sako, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 89 days.

(21) Appl. No.: 17/192,984

(22) Filed: Mar. 5, 2021

(65) Prior Publication Data

US 2021/0190363 A1 Jun. 24, 2021

Related U.S. Application Data

(63) Continuation of application No. PCT/JP2020/002845, filed on Jan. 27, 2020.

(30) Foreign Application Priority Data

Sep. 17, 2019 (JP) .............................. JP2019-168425

(51) Int. Cl.
*F24F 11/63* (2018.01)
*F24F 11/74* (2018.01)
(Continued)

(52) U.S. Cl.
CPC .............. *F24F 11/63* (2018.01); *F24F 11/74* (2018.01); *G05B 15/02* (2013.01);
(Continued)

(58) Field of Classification Search
CPC ........ F24F 11/63; F24F 11/74; F24F 2110/10; F24F 2120/12; F24F 2221/38;
(Continued)

(56) References Cited

U.S. PATENT DOCUMENTS 8,555,188 B2 * 10/2013 Kim ................. H04N 21/41265
715/811
9,152,154 B2 * 10/2015 Gupta .................. F24F 11/0001
(Continued)

FOREIGN PATENT DOCUMENTS

CN 105091204 A 11/2015
JP 2005-061661 A 3/2005
(Continued)

OTHER PUBLICATIONS

English Translation of the Written Opinion of the International Searching Authority for PCT/JP2020/002845; dated Mar. 31, 2020; pp. 1-5.*

*Primary Examiner* — Ramesh B Patel
(74) *Attorney, Agent, or Firm* — Oblon, McClelland, Maier & Neustadt, L.L.P.

(57) ABSTRACT

According to one embodiment, a control device for an air conditioner which is communicably connected to first and second terminal devices to be used by first and second users is provided. The control device includes a processor. The processor configured to receive a first personal set temperature which is a temperature set by the first user by operating the first terminal device, receive a second personal set temperature which is a temperature set by the second user by operating the second terminal device, and determine a set value of the air conditioner based on the first personal set temperature and the second personal set temperature.

25 Claims, 17 Drawing Sheets

(51) Int. Cl.
*G05B 15/02* (2006.01)
*F24F 120/12* (2018.01)
*F24F 110/10* (2018.01)

(52) U.S. Cl.
CPC ....... *F24F 2110/10* (2018.01); *F24F 2120/12* (2018.01); *F24F 2221/38* (2013.01)

(58) Field of Classification Search
CPC .......... F24F 11/523; F24F 11/56; F24F 11/79; F24F 11/80; G05B 15/02; G05B 2219/2614
See application file for complete search history.

(56) References Cited

U.S. PATENT DOCUMENTS

| | | | | |
|---|---|---|---|---|
| 9,489,062 | B2* | 11/2016 | Corcoran | G06F 3/04847 |
| 9,500,379 | B2* | 11/2016 | Schnell | F24F 11/0008 |
| 10,119,716 | B2* | 11/2018 | Maeda | F24F 11/30 |
| 11,029,050 | B2* | 6/2021 | Sha | H04L 12/2818 |
| 11,209,181 | B2* | 12/2021 | Atchison | G05B 19/048 |
| 11,274,848 | B2* | 3/2022 | Fujiwara | F24F 11/49 |
| 2004/0213384 | A1* | 10/2004 | Alles | H04M 7/0069 |
| | | | | 379/70 |
| 2005/0090915 | A1* | 4/2005 | Geiwitz | G05B 15/02 |
| | | | | 700/275 |
| 2009/0140064 | A1* | 6/2009 | Schultz | G05D 23/1905 |
| | | | | 236/51 |
| 2010/0070086 | A1* | 3/2010 | Harrod | G06F 8/34 |
| | | | | 422/123 |
| 2012/0191257 | A1* | 7/2012 | Corcoran | H04L 12/2818 |
| | | | | 700/278 |
| 2013/0289778 | A1* | 10/2013 | Ishizaka | F24F 11/30 |
| | | | | 700/276 |
| 2014/0142773 | A1* | 5/2014 | Ling | H04L 12/282 |
| | | | | 700/291 |
| 2015/0039136 | A1* | 2/2015 | Gazdzinski | G06T 1/20 |
| | | | | 700/276 |
| 2015/0293541 | A1* | 10/2015 | Fadell | F24F 11/30 |
| | | | | 700/276 |
| 2016/0091877 | A1* | 3/2016 | Fullam | G09G 3/00 |
| | | | | 700/275 |
| 2016/0169547 | A1* | 6/2016 | Matsuoka | F24F 11/30 |
| | | | | 700/278 |
| 2017/0124842 | A1* | 5/2017 | Sinha | A61M 5/1723 |
| 2017/0130979 | A1* | 5/2017 | Kolavennu | F24F 11/62 |
| 2019/0017720 | A1* | 1/2019 | Otsuki | F24F 11/65 |
| 2019/0041883 | A1* | 2/2019 | Clark | G05D 23/1934 |
| 2019/0171171 | A1* | 6/2019 | Verteletskyi | G06Q 90/205 |
| 2019/0346164 | A1* | 11/2019 | Sha | F24F 11/54 |
| 2022/0057097 | A1* | 2/2022 | Vie | F24F 11/64 |

FOREIGN PATENT DOCUMENTS

| | | |
|---|---|---|
| JP | 2009-052805 A | 3/2009 |
| JP | 2013-104632 A | 5/2013 |
| JP | 2019-019988 A | 2/2019 |
| JP | 2019-056498 A | 4/2019 |
| WO | WO 2018/193539 A1 | 10/2018 |
| WO | WO 2019/087234 A1 | 5/2019 |

* cited by examiner

| Air conditioner | Air conditioner model number |
|---|---|
| Air conditioner A | X123 |

| Air conditioner name (model number) | Operation mode | Set temperature | Air direction of outlet 1 | Air direction of outlet 2 | Air direction of outlet 3 | Air direction of outlet 4 |
|---|---|---|---|---|---|---|
| Air conditioner A (X123) | Heating mode | 18 ∨ ... ∨ 28 | Horizontal Middle Down | Horizontal Middle Down | Horizontal Middle Down | Horizontal Middle Down |
| | Cooling mode | 18 ∨ ... ∨ 28 | Horizontal Middle Down | Horizontal Middle Down | Horizontal Middle Down | Horizontal Middle Down |

F I G. 8

| First state | Second state | Third state | Fourth state |
|---|---|---|---|
| Set temperature | Set temperature | Set temperature | Set temperature |
| 22 | 22 | 23 | 22 |
| Air direction | Air direction | Air direction | Air direction |
| (→、→、→、→) | (→、↓、→、→) | (↓、↓、→、→) | (→、↓、→、→) |

FIG. 15

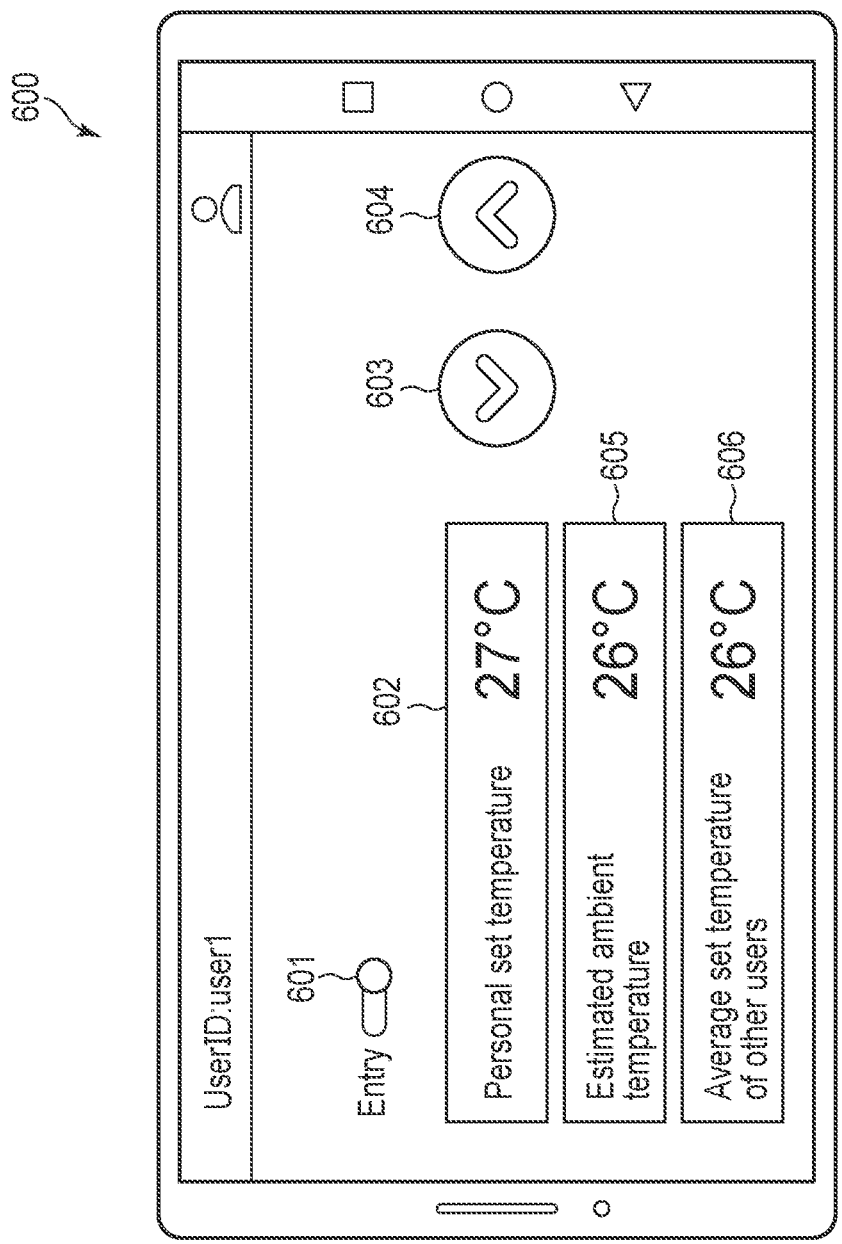
F I G. 18

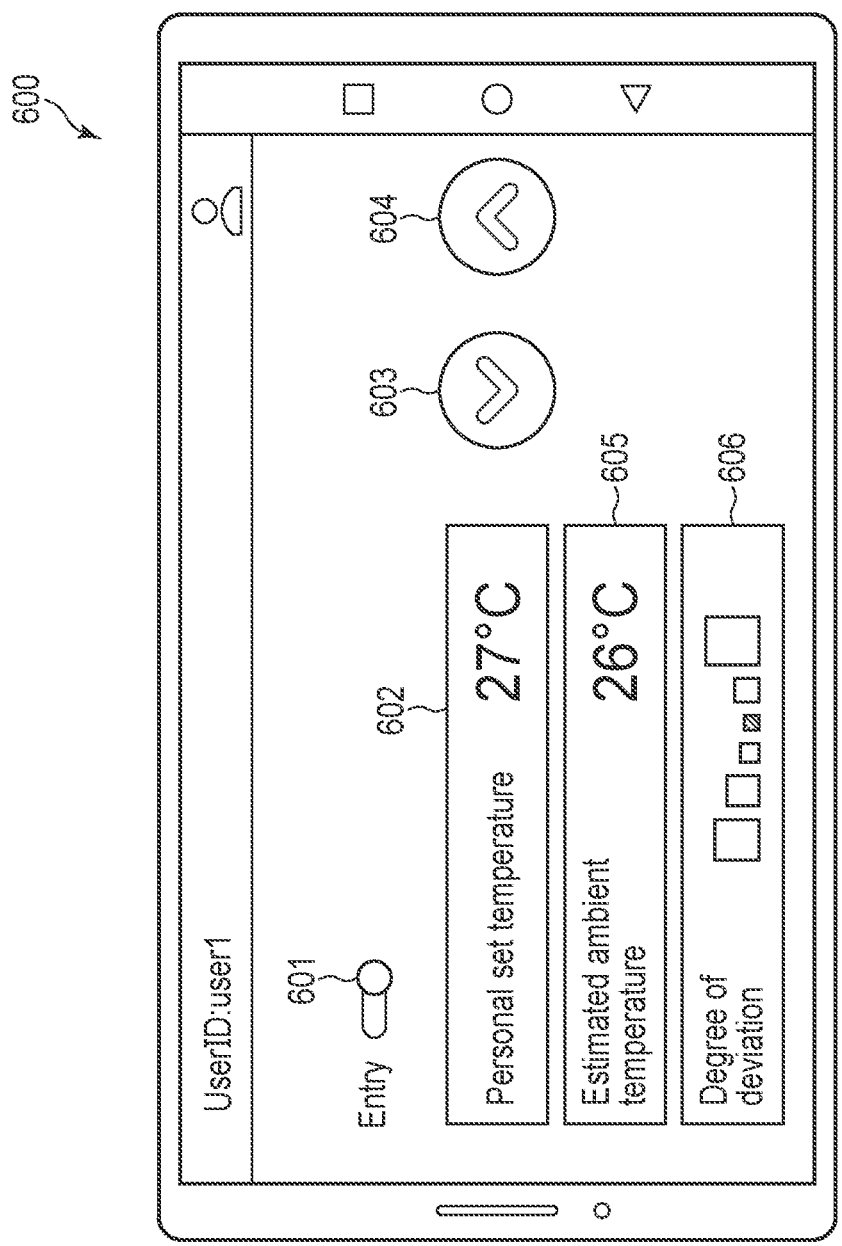
F I G. 19

CONTROL DEVICE AND METHOD FOR CONTROLLING AIR CONDITIONER COMMUNICATIVELY COUPLED TO MULTIPLE USER DEVICES

CROSS-REFERENCE TO RELATED APPLICATIONS

This application is a Continuation Application of PCT Application No. PCT/JP2020/002845, filed Jan. 27, 2020, and based upon and claiming the benefit of priority from Japanese Patent Application No. 2019-168425, filed Sep. 17, 2019, the entire contents of all of which are incorporated herein by reference.

FIELD

Embodiments described herein relate generally to a control device, a terminal device, and a method.

BACKGROUND

Generally, an air conditioner (indoor unit) is installed in a room such as an office, and an operation of the air conditioner is controlled by a user in the room operating a remote controller of the air conditioner or the like.

Therefore, for example, when the user feels that the comfort level in the room is low, the user can operate the remote controller to change a set temperature of the air conditioner or the like.

However, when a plurality of users are present in the room, it is difficult to improve the comfort level of the plurality of users by operating one remote controller.

BRIEF DESCRIPTION OF THE DRAWINGS

FIG. 8 is a diagram showing an example of a screen for changing ranges of values that can be taken by parameters.
FIG. 15 is a diagram showing set values of the air conditioner in each of first to fourth states.
FIG. 18 is a diagram showing another example of the setting screen.
FIG. 19 is a diagram showing still another example of the setting screen.

DETAILED DESCRIPTION

Figure 1:
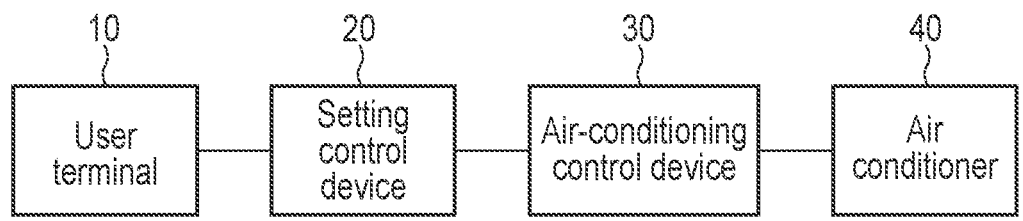
FIG. 1 is a diagram for explaining the outline of an air-conditioning system according to a first embodiment.

In general, according to one embodiment, a control device for an air conditioner which is communicably connected to first and second terminal devices to be used by first and second users is provided. The control device includes a processor. The processor configured to receive a first personal set temperature which is a temperature set by the first user by operating the first terminal device, receive a second personal set temperature which is a temperature set by the second user by operating the second terminal device, and determine a set value of the air conditioner based on the first personal set temperature and the second personal set temperature.

Various embodiments will be described hereinafter with reference to the accompanying drawings.

First Embodiment

First, the outline of an air-conditioning system according to a first embodiment will be described with reference to FIG. 1. The air-conditioning system according to the present embodiment includes a user terminal 10, a setting control device 20, an air-conditioning control device (air-conditioning controller) 30, and an air conditioner 40. The air-conditioning system according to the present embodiment is used by a user in a room where the air conditioner (indoor unit) 40 is installed.

The user terminal 10 is a terminal device to be used by a user. In the present embodiment, the user terminal 10 is assumed to be a mobile terminal such as a smartphone or a tablet terminal, but the user terminal 10 may be a desktop type or notebook type personal computer or the like. The user terminal 10 is communicably connected to the setting control device 20 via a network. Although only one user terminal 10 is shown in FIG. 1 for convenience, the air-conditioning system according to the present embodiment includes a plurality of user terminals 10 to be used by a plurality of respective users who enter the room where the air conditioner 40 is installed.

The setting control device 20 is an information processing device (electronic device) that functions as, for example, a server device for optimizing (controlling) the set values of the air conditioner 40. The set values of the air conditioner 40 refer to the values of parameters (control factors) that can be operated (set) by a remote controller of the air conditioner 40 or the like. In the air-conditioning system, by changing these set values, it is possible to change the effectiveness of air conditioning such as heat and a flow of air supplied from the air conditioner 40 into the room. The set values of the air conditioner 40 include the set temperature, the direction of the air blown from an outlet (or a louver flap) of the air conditioner 40 (hereinafter referred to as an air direction of the outlet), and the like. The set values of the air conditioner 40 optimized by the setting control device 20 are transmitted to the air-conditioning control device 30.

The air-conditioning control device 30 is connected to the air conditioner 40, and controls the operation of the air conditioner 40 by transmitting the set values optimized by the setting control device 20 to the air conditioner 40.

As described above, the air conditioner 40 is installed in the room. In the present embodiment, the room is assumed to be a space such as one room in a building, but may be an area in a facility which is a space distinguished by a floor, an inner wall, and the like. In the following description, the room where the air conditioner 40 is installed is referred to as a target room for convenience.

Although the setting control device 20 and the air-conditioning control device 30 have been described as separate devices in FIG. 1, the setting control device 20 and the air-conditioning control device 30 may be configured as one body.

Figure 2:
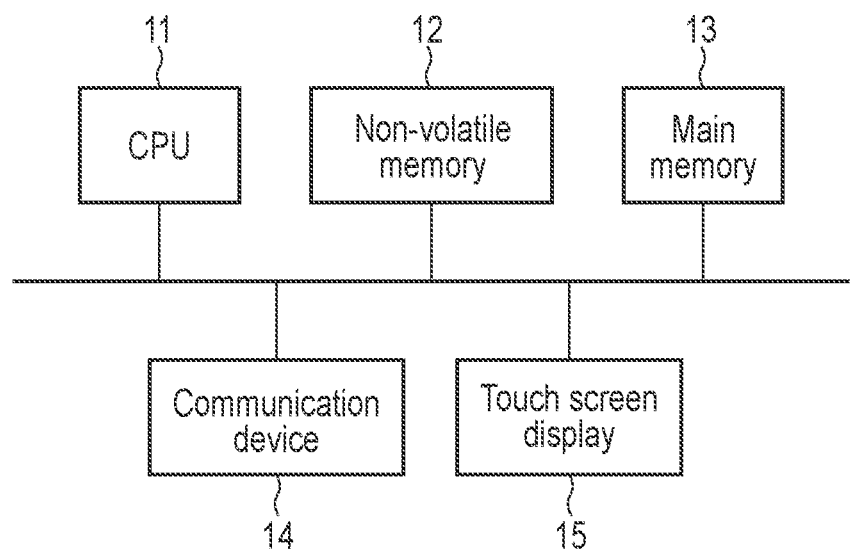
FIG. 2 is a diagram showing an example of a hardware configuration of a user terminal.

FIG. 2 shows an example of a hardware configuration of the user terminal 10 shown in FIG. 1. Here, a case where the user terminal 10 is, for example, a smartphone will be described.

As shown in FIG. 2, the user terminal 10 includes a CPU 11, a non-volatile memory 12, a main memory 13, a communication device 14, a touch screen display 15, and the like.

The CPU 11 is a hardware processor that controls the operation of each component in the user terminal 10. The CPU 11 executes various programs loaded from the non-volatile memory 12 which is a storage device into the main memory 13. The program executed by the CPU 11 includes an operating system (OS) and an application program for a user to use the air-conditioning system (hereinafter referred to as an air-conditioning application).

The communication device 14 is a device configured to execute communication with an external device such as the setting control device 20.

The touch screen display 15 is attached so as to be superposed on the upper surface of the main body of the user terminal 10 (for example, a smartphone). The touch screen display 15 incorporates a flat panel display and a sensor configured to detect a contact position of, for example, a finger or the like on the screen of the flat panel display. The flat panel display includes, for example, a liquid crystal display (LCD) and the like. As the sensor, for example, a capacitance type touch panel or the like can be used.

According to such a touch screen display 15, it is possible to detect an operation of the user (for example, an operation of touching the screen) on the screen displayed on the user terminal 10 (flat panel display).

Figure 3:
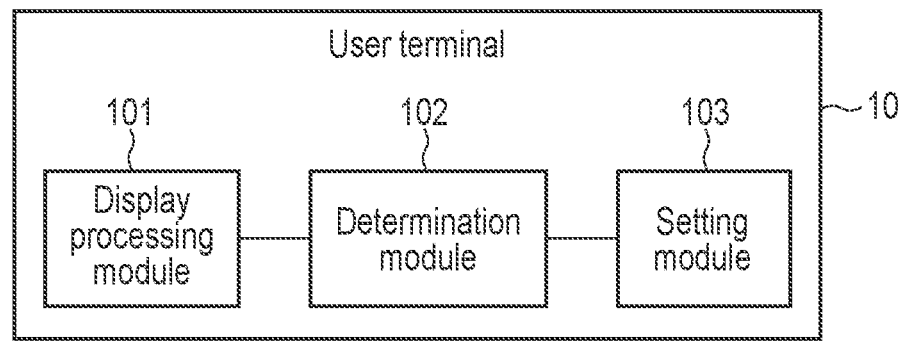
FIG. 3 is a diagram showing an example of a functional configuration of the user terminal.

FIG. 3 shows an example of a functional configuration of the user terminal 10. As shown in FIG. 3, the user terminal 10 includes a display processing module 101, a determination module 102, and a setting module 103.

In the present embodiment, some or all of these modules 101 to 103 are realized by causing the CPU 11 to execute the above-mentioned air-conditioning application, that is, by software. In addition, some or all of these modules 101 to 103 may be realized by hardware such as an IC (Integrated Circuit), or may be realized as a combination configuration of software and hardware.

The display processing module 101 displays a predetermined screen for a user to use the air-conditioning system. Details of the screen displayed by the display processing module 101 will be described later.

The determination module 102 determines whether or not the user has entered the target room according to the operation of the user on the screen displayed by the display processing module 101. The determination module 102 can also determine whether or not the user has left the target room according to the operation of the user on the screen displayed by the display processing module 101.

When the determination module 102 determines that the user has entered the target room, the setting module 103 sets a personal set temperature of the user according to the operation of the user on the screen displayed by the display processing module 101. The personal set temperature set by the setting module 103 is transmitted to the setting control device 20.

In the present embodiment, the personal set temperature is a set temperature of the air conditioner 40 which is personal to the user who uses the user terminal 10. That is, when a plurality of users are present in the target room, one remote controller corresponding to the air conditioner 40 is generally shared by the plurality of users, but in the present embodiment, the plurality of users in the target room can individually set desired personal set temperatures on the user terminals 10 used by the plurality of users, respectively.

Figure 4:
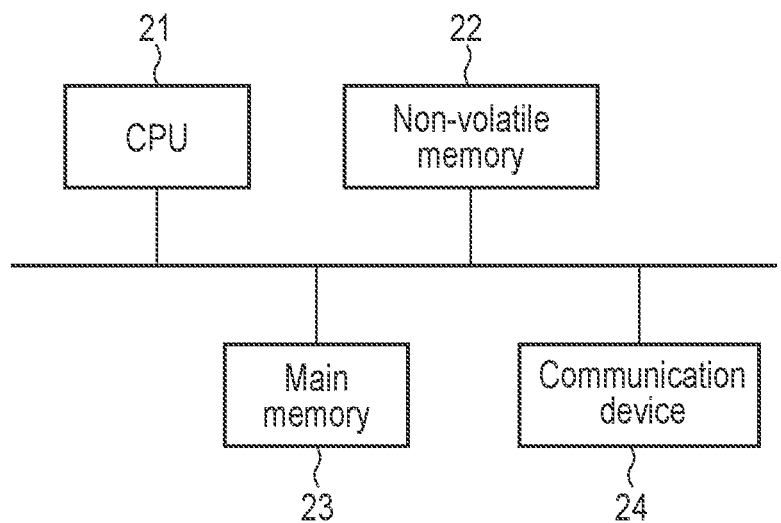
FIG. 4 is a diagram showing an example of a hardware configuration of a setting control device.

FIG. 4 shows an example of a hardware configuration of the setting control device 20 shown in FIG. 1. As shown in FIG. 4, the setting control device 20 includes a CPU 21, a non-volatile memory 22, a main memory 23, a communication device 24, and the like.

The CPU 21 is a hardware processor that controls the operation of each component in the air-conditioning control device 30. The CPU 21 executes various programs loaded from the non-volatile memory 22 which is a storage device into the main memory 23. The program executed by the CPU 21 includes an operating system (OS) and an application program for controlling the set values of the air conditioner 40 (hereinafter referred to as a setting control program).

The communication device 24 is a device configured to execute communication with an external device such as the user terminal 10 and the air-conditioning control device 30.

Although only the CPU 21, the non-volatile memory 22, the main memory 23, and the communication device 24 are shown in FIG. 4, the setting control device 20 may include, for example, other storage devices such as an HDD (Hard Disk Drive) and an SSD (Solid State Drive), or may include an input device such as a keyboard or a mouse and a display device such as a liquid crystal display.

Figure 5:
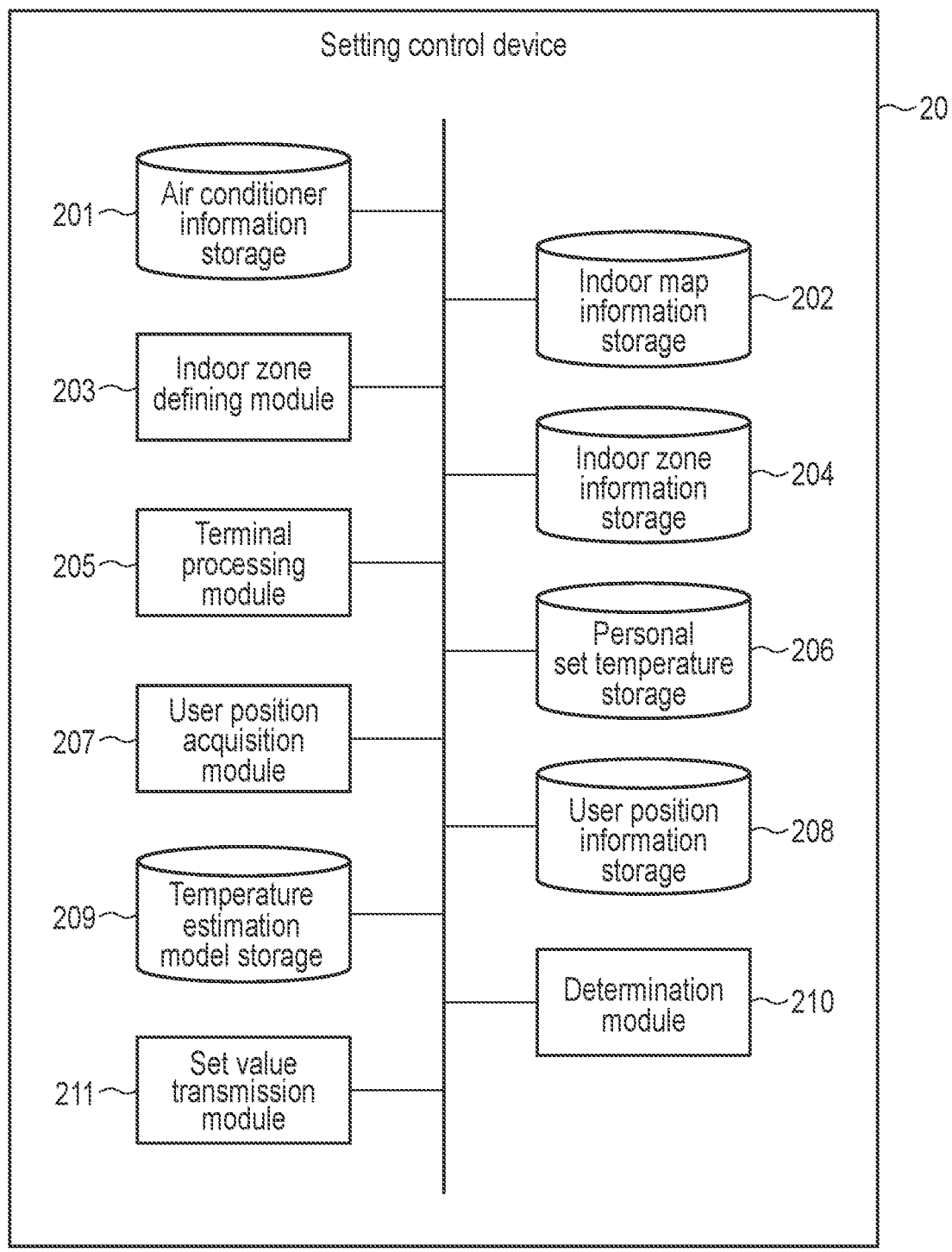
FIG. 5 is a diagram showing an example of a functional configuration of the setting control device.

FIG. 5 shows an example of a functional configuration of the setting control device 20. As shown in FIG. 5, the setting control device 20 includes an air conditioner information storage 201, an indoor map information storage 202, an indoor zone defining module 203, an indoor zone information storage 204, a terminal processing module 205, a personal set temperature storage 206, a user position acquisition module 207, a user position information storage 208, a temperature estimation model storage 209, a determination module 210, and a set value transmission module 211.

In the present embodiment, the air conditioner information storage 201, the indoor map information storage 202, the indoor zone information storage 204, the personal set temperature storage 206, the user position information storage 208, and the temperature estimation model storage 209 are realized by the non-volatile memory 22 shown in FIG. 4 or another storage device or the like.

Further, in the present embodiment, some or all of the indoor zone defining module 203, the terminal processing module 205, the user position acquisition module 207, the determination module 210, and the set value transmission module 211 are realized by causing the CPU 21 to execute the above-mentioned setting control program, that is, by software. In addition, some or all of these modules 203, 205, 207, 210, and 211 may be realized by hardware such as an IC, or may be realized as a combination configuration of software and hardware.

The air conditioner information storage 201 stores information related to the set values of the air conditioner 40 (hereinafter referred to as air conditioner information). The air conditioner information includes ranges (control ranges) of the values that can be taken by parameters for controlling the operation of the air conditioner 40.

The indoor map information storage 202 stores information indicating a map (plan view) corresponding to the floor plan of the target room (hereinafter referred to as indoor map information). The air conditioner 40 installed in the target room is arranged on the map indicated by the indoor map information.

The indoor zone defining module 203 divides the target room (air-conditioned space) based on the indoor map information stored in the indoor map information storage 202, thereby forming a plurality of areas (hereinafter referred to as indoor zones) constituting the target room.

The indoor zone information storage 204 stores information indicating (arrangement of) the plurality of indoor zones defined by the indoor zone defining module 203 (hereinafter referred to as indoor zone information).

The terminal processing module 205 executes communication with the user terminal 10. Specifically, the terminal processing module 205 receives the personal set temperature transmitted from the user terminal 10 (setting module 103).

The personal set temperature storage 206 stores the personal set temperature received by the terminal processing module 205. The personal set temperature storage 206 stores the respective personal set temperatures of the plurality of users in the target room.

The user position acquisition module 207 acquires the position of the user (or the user terminal 10 used by the user) in the target room.

The user position information storage 208 stores information indicating the position acquired by the user position acquisition module 207 (hereinafter referred to as user position information). The user position information storage 208 stores user position information indicating the respective positions of the plurality of users in the target room.

The temperature estimation model storage 209 stores a temperature estimation model used for estimating the temperature (room temperature) in each of the plurality of indoor zones indicated by the indoor zone information stored in the indoor zone information storage 204 described above.

The determination module 210 optimizes the set values of the air conditioner 40 based on the air conditioner information stored in the air conditioner information storage 201, the indoor zone information stored in the indoor zone information storage 204, the personal set temperature stored in the personal set temperature storage 206, the user position information stored in the user position information storage 208, and the temperature estimation model stored in the temperature estimation model storage 209. In this case, the determination module 210 determines (selects) the optimum set values of the air conditioner 40 from the ranges of the values that can be taken by the parameters included in the above-mentioned air conditioner information. The details of the process of the determination module 210 will be described later.

The set value transmission module 211 transmits the set values determined (optimized) by the determination module 210 to the air-conditioning control device 30.

Figures 6, 7:
FIG. 6 is a diagram showing an example of a data structure of air conditioner information.
FIG. 7 is a diagram showing an example of a model number input screen.

FIG. 6 shows an example of the data structure of the air conditioner information stored in the air conditioner information storage 201 shown in FIG. 5. As shown in FIG. 6, the air conditioner information includes the ranges of the values that can be taken by the parameters for controlling the operation of the air conditioner 40 (that is, ranges that can be set as set values) in association with an operation mode of the air conditioner 40.

The operation mode includes, for example, a "heating mode" in which the air conditioner 40 performs a heating operation and a "cooling mode" in which the air conditioner 40 performs a cooling operation. The parameters for controlling the operation of the air conditioner 40 include, for example, the set temperature and the air direction.

Here, in the present embodiment, the air conditioner 40 is, for example, a ceiling cassette four-way type, including four outlets for blowing air in (horizontal) four directions each of which is configured to control the (vertical) directions of the air independently.

In this case, the air conditioner information includes "11 levels of 18° C. to 28° C. in increments of 1° C." as the range of the value that can be taken by (the parameter of) the set temperature in association with the operation mode "heating mode". According to this, it is indicated that, when the air conditioner 40 performs the heating operation, the set temperature can be set in increments of 1° C. in the range of 18° C. to 28° C.

In addition, the air conditioner information includes "outlet 1 horizontal/middle/down", "outlet 2 horizontal/middle/down", "outlet 3 horizontal/middle/down", and "outlet 4 horizontal/middle/down" as the ranges of the values that can be taken by (the parameters of) the vertical air directions in association with the operation mode "heating mode". According to this, it is indicated that, when the air conditioner 40 performs the heating operation, the vertical air direction of each of the four outlets (outlets 1 to 4) provided in the air conditioner 40 can be set in the three levels of "horizontal", "middle", and "down".

Here, although the case where the operation mode is the "heating mode" has been described, the same applies to the case where the operation mode is the "cooling mode".

The air conditioner information may be stored in the air conditioner information storage 201 in advance, but, for example, the manager who is in charge of managing air conditioner systems in a room such as an office facility may input the air conditioner information to the setting control device 20. In this case, since it is complicated for the manager to manually input the air conditioner information shown in FIG. 6, for example, the screen as shown in FIG. 7 (hereinafter referred to as a model number input screen) may be displayed on (the display of) the setting control device 20, and the manager may input (designate) the air conditioner name (for example, an air conditioner A) of the air conditioner 40 installed in the target room and the model number of the air conditioner 40 on the model number input screen. According to this, it is possible to automatically set (register) the air conditioner information regarding the set values of the air conditioner 40 specified based on the model number input by the manager. By providing, for example, a pull-down button on the model number input screen, the model number of the air conditioner 40 may be selected from the model numbers registered in advance.

Further, the manager may change (limit) the range of the value that can be taken by each parameter (set temperature and air direction) by selecting each check box on the screen as shown in FIG. 8.

Figure 9:
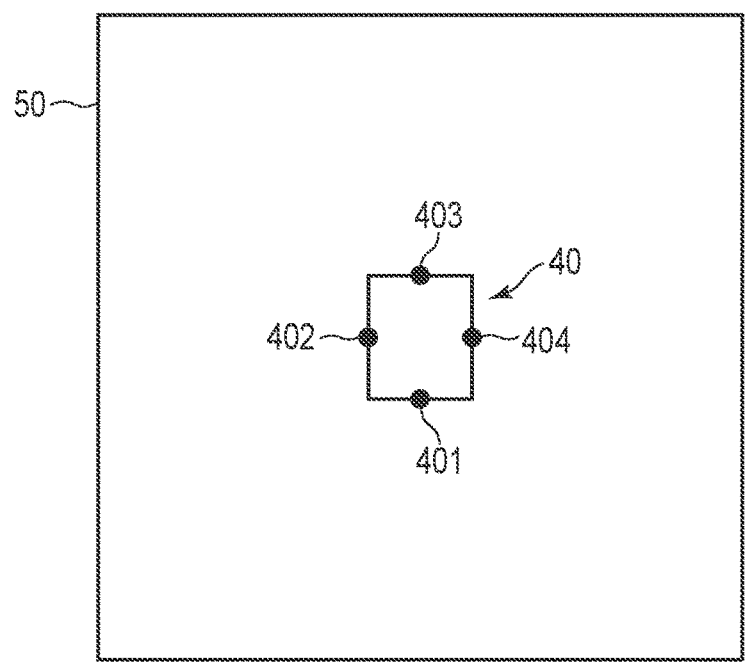
FIG. 9 is a diagram for explaining indoor map information.

Next, the indoor map information stored in the indoor map information storage 202 shown in FIG. 5 will be described with reference to FIG. 9. As shown in FIG. 9, the indoor map information shows a map corresponding to (a floor plan of) a target room 50, and the air conditioner 40 installed in the target room 50 is arranged on the map. That is, the indoor map information is information in which positions (x, y coordinates) of the air conditioner 40 and outlets 401 to 404 provided in the air conditioner 40 with respect to the target room 50 are defined. The outlets 401 to 404 correspond to the "outlets 1 to 4" in the above-mentioned air conditioner information.

In the example shown in FIG. 9, the air conditioner 40 is arranged near the center of the target room 50 having a substantially square shape in a plan view. Further, the air conditioner 40 is arranged so that the outlet 401 provided in the air conditioner 40 faces the lower side, the outlet 402 faces the left side, the outlet 403 faces the upper side, and the outlet 404 faces the right side. In other words, the first to fourth outlets 401 to 404 are located clockwise from the lower side of the target room 50 (two-dimensional plane).

The indoor map information may be stored in the indoor map information storage 202 in advance, but a manager of the air-conditioning system may input the indoor map information to the setting control device 20 similarly to the above-mentioned air conditioner information. In this case, the manager may input (designate) the positions of the air conditioner 40 and the outlets 401 to 404 provided in the air conditioner 40, for example, on the map (plan view) of the target room 50 displayed on (the display of) the setting control device 20. In this case, an input support function that enables input by an operation such as drag and drop may be prepared.

Further, in the indoor map information, it is necessary to arrange (define) the outlets 401 to 404 so as to respectively correspond to the "outlets 1 to 4" in the above-mentioned air conditioner information. Therefore, when the manager inputs the indoor map information as described above, a function capable of rotating the air conditioner 40 in units of 90 degrees on the map of the target room 50 may be prepared.

Further, although it has been described that, in the indoor map information, the x and y coordinates of the air conditioner 40 and the outlets 401 to 404 provided in the air conditioner 40 are defined, the indoor map information may be information in which the positions of the air conditioner 40 and the outlets 401 to 404 provided in the air conditioner 40 are defined in three-dimensional coordinates (x, y, z).

The indoor map information may be information of aspects other than those described in FIG. 9 as long as the range of the target room 50, the position of the air conditioner 40, and the positions (directions) of the first to fourth outlets 401 to 404 provided in the air conditioner 40 can be grasped.

Next, the indoor zone information stored in the indoor zone information storage 204 shown in FIG. 5 will be described with reference to FIG. 10. The indoor zone information is information indicating a plurality of indoor zones defined by dividing the target room 50 shown in FIG. 9 referred to above.

Here, the plurality of indoor zones indicated by the indoor zone information are automatically defined by the indoor zone defining module 203 based on the indoor map information stored in the indoor map information storage 202. Each indoor zone is defined so as to correspond to (the position of) each of the outlets 401 to 404 with respect to the target room 50 defined in the above-mentioned indoor map information.

Specifically, the technique called Voronoi tessellation is applied to the target room 50, for example, based on the positions (x, y coordinates) of the outlets 401 to 404 defined on (the plan view of) the map indicated by the indoor map information.

Figure 10:
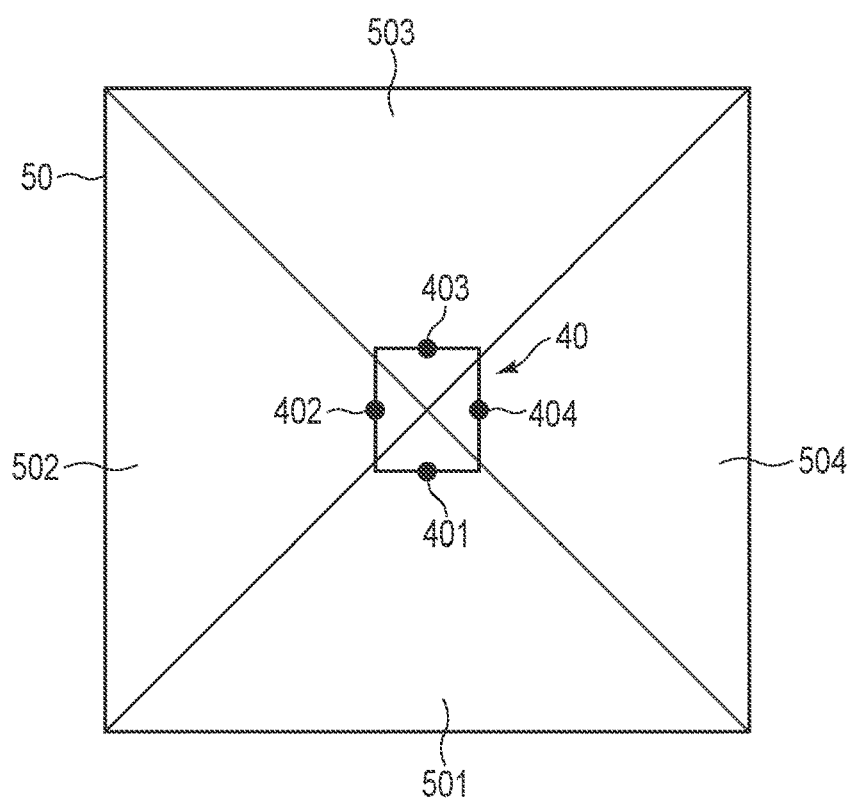
FIG. 10 is a diagram for explaining indoor zone information.

FIG. 10 shows the result of the Voronoi tessellation based on the indoor map information described in FIG. 9. According to the Voronoi tessellation, all the points included in the target room 50 are processed so that the points (positions on the map) where the closest outlet among the outlets 401 to 404 is the same are the same indoor zone, so that the target room 50 is divided into a plurality of indoor zones. In the example shown in FIG. 10, the target room 50 is divided into an indoor zone 501 corresponding to the outlet 401, an indoor zone 502 corresponding to the outlet 402, an indoor zone 503 corresponding to the outlet 403, and an indoor zone 504 corresponding to the outlet 404. In this case, the indoor zone information indicating (the x, y coordinates representing each of) the indoor zones 501 to 504 is stored in the indoor zone information storage 204.

Here, although the case where the indoor zones 501 to 504 are defined by the Voronoi tessellation has been described, the indoor zones may be defined by other methods. In addition, the indoor zones do not necessarily have to be defined so as to respectively correspond to the outlets 401 to 404. For example, the target room 50 may be divided into smaller indoor zones (that is, areas more than the number of outlets).

Figure 11:
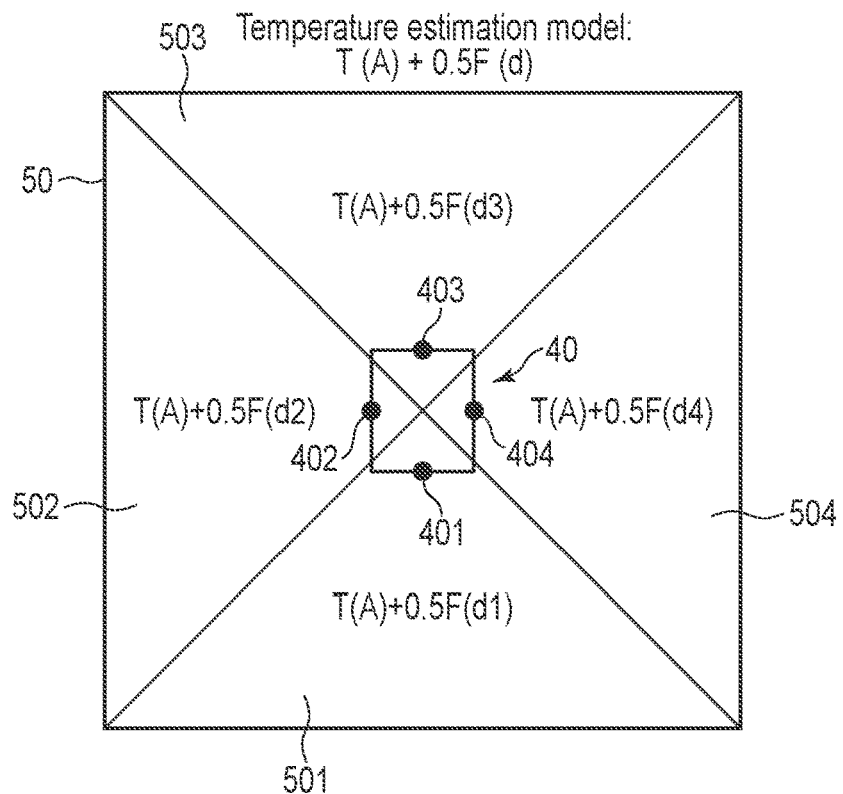
FIG. 11 is a diagram for explaining a temperature estimation model.

Next, the temperature estimation model stored in the temperature estimation model storage 209 shown in FIG. 5 will be described with reference to FIG. 11.

The temperature estimation model refers to a model formula for estimating the temperature (room temperature) of each of the indoor zones 501 to 504 indicated by the indoor zone information stored in the above-mentioned indoor zone information storage 204 when the operation of the air conditioner 40 is controlled based on a predetermined set value. According to such a temperature estimation model, it is possible to obtain an estimated value of the temperature according to the control of the operation (that is, the set value) of the air conditioner 40.

In the present embodiment, for convenience of description, the temperature in the same indoor zone among the indoor zones 501 to 504 is uniform (constant value), and the temperature is determined by the operation (that is, the set value) of the air conditioner 40.

Specifically, assuming that the air conditioner 40 is A and the indoor zone indicated by the indoor zone information is d, a temperature estimation model f (A, d) of the indoor zone d according to the set values of the air conditioner 40 is considered to be represented as:

$$f(A,d)=T(A)+0.5F(d).$$

Here, T (A) is the set temperature (variable) of the air conditioner 40. F (d) is the air direction (variable) of the outlet corresponding to the indoor zone d. The value given to the above-mentioned temperature estimation model as the air direction of the outlet is 0 for "horizontal", 1 for "middle", and 2 for "down".

According to the above-mentioned temperature estimation model (formula), the estimated temperature of the indoor zone d is determined by the set temperature T (A) of the air conditioner 40 and the air direction F (d) of the outlet corresponding to the indoor zone d. In addition, this temperature estimation model assumes the case where the air conditioner 40 performs the heating operation, and expresses that the temperature of the indoor zone d corresponding to the outlet becomes higher as the air direction of the outlet becomes downward.

Here, it is assumed that the above-mentioned indoor zones 501 to 504 are d1 to d4, respectively, and the temperatures of the indoor zone 501 (d1) and the indoor zone 503 (d3) among the indoor zones 501 to 504 are estimated.

First, for example, assuming that the set temperature T (A) of the air conditioner 40 is 24° C. and the air direction F (d1) of the outlet 401 corresponding to the indoor zone 501 is "horizontal (0)", the estimated temperature of the indoor zone 501 is:

$$f(A,d1)=T(A)+0.5F(d1)=24+0.5\times 0=24.0(° C.).$$

On the other hand, assuming that the set temperature T (A) of the air conditioner 40 is 24° C. and the air direction F (d3) of the outlet 403 is "down (2)", the estimated temperature of the indoor zone 503 is:

$$f(A,d3)=T(A)+0.5F(d3)=24+0.5\times 2=25.0(° C.).$$

Here, although the estimated temperatures of the indoor zone 501 and the indoor zone 503 have been described, the same applies to the other indoor zones.

The above-mentioned temperature estimation model is an example and may be changed as appropriate. Specifically, for example, when the "effectiveness" of the air conditioner 40 is poor, the temperature estimation model can also be represented as:

$$f(A,d)=T(A)+0.5F(d)-1.0.$$

By adding the constant term in this way, the "effectiveness" of the air conditioner 40 can be adjusted in the temperature estimation model.

Here, although the case where the air conditioner 40 performs the heating operation has been described, when the air conditioner 40 performs the cooling operation, the temperature estimation model f (A, d) is considered to be represented as:

$$f(A,d)=T(A)-0.5F(d).$$

This temperature estimation model expresses that the temperature of the indoor zone d corresponding to the outlet becomes lower as the air direction of the outlet becomes downward.

It is considered that the temperatures of the indoor zones 501 to 504 differ depending on the outside air temperature, sunshine, an indoor layout, presence/absence of a person, the condition of heat generating equipment in the room, and the like. Further, it is considered that there is actually a temperature gradient in each of the indoor zones 501 to 504, and the temperature is not uniform. Therefore, the temperature of each of the indoor zones 501 to 504 may be estimated by using a more complicated temperature estimation model to which parameters considering these are added. Further, it is also possible to use a different temperature estimation model for each of the indoor zones 501 to 504, for example, depending on the environment of the target room 50.

The temperature estimation model used in the present embodiment is defined (prepared) in advance by, for example, measuring the actual temperature of the target room 50 (indoor zones 401 to 404) for each set value (set temperature and air direction) of the air conditioner 40), and is stored in the temperature estimation model storage 209.

Figure 12:
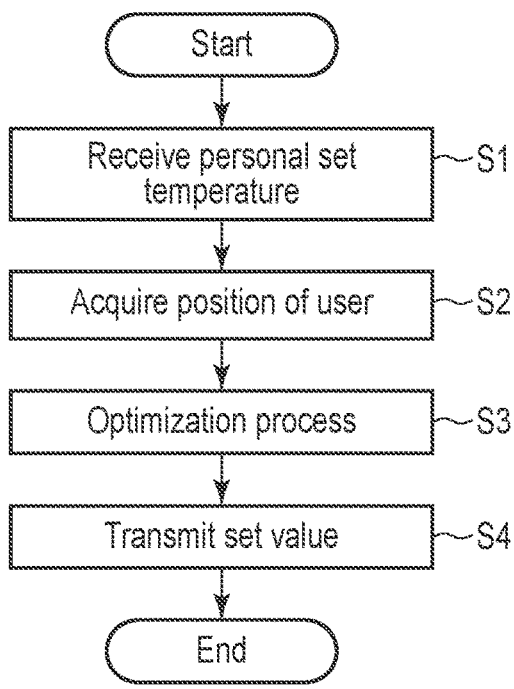
FIG. 12 is a flowchart showing an example of a processing procedure of the setting control device.

Next, an example of the processing procedure of the setting control device 20 according to the present embodiment will be described with reference to the flowchart of FIG. 12. The process shown in FIG. 12 is executed, for example, when a user (hereinafter referred to as a target user) has entered the target room 50.

First, the user who enters the target room 50 activates the above-mentioned air-conditioning application on the user terminal 10 (for example, a smartphone).

Figure 13:
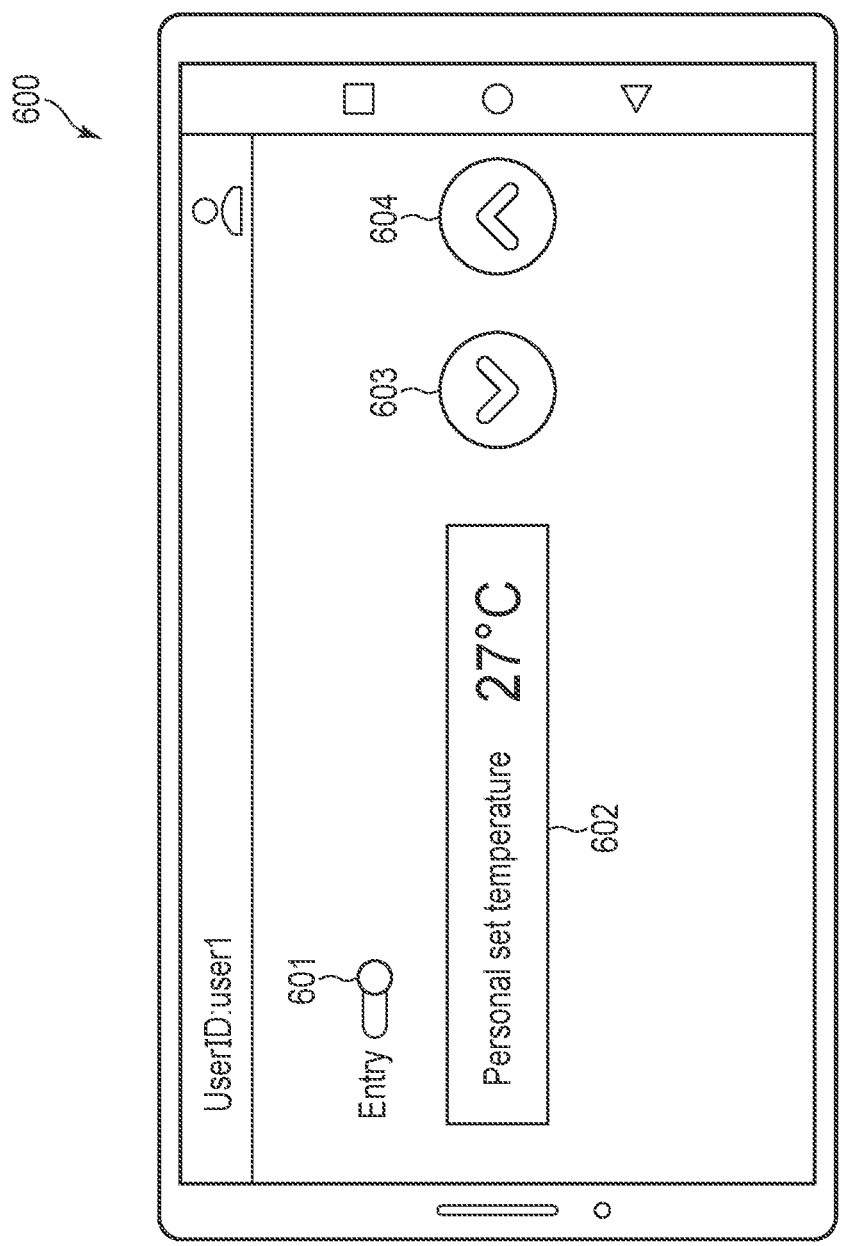
FIG. 13 is a diagram showing an example of a setting screen.

Here, FIG. 13 shows an example of a screen (hereinafter referred to as a setting screen) displayed on the user terminal 10 when the air-conditioning application is activated.

As shown in FIG. 13, on a setting screen 600, together with a user ID (user1) for identifying the target user, for example, an entry/exit changeover switch 601, a set temperature display area 602, a first change button 603, and a second change button 604 are displayed.

The entry/exit changeover switch 601 is a switch for setting (switching) that the target user has entered the target room 50 and that the target user has left the target room 50. When the target user has entered the target room 50, the target user sets that the target user has entered the target room 50 by performing an operation of touching the entry/ exit changeover switch 601 on the setting screen 600. The entry/exit changeover switch 601 of the setting screen 600 shown in FIG. 13 indicates that the target user has entered the target room 50.

The set temperature display area 602 is an area for displaying (setting) the personal set temperature of the target user. At the time when it is set that the target user has entered the target room 50 by the entry/exit changeover switch 601 as described above, for example, a default personal set temperature is displayed in the set temperature display area 602.

In the set temperature display area 602, the personal set temperature (hereinafter referred to as a past personal set temperature) set when the target user has entered the target room 50 in the past may be displayed. In this case, for example, by holding the personal set temperature at the time when the target user has left the target room 50 in the past in the user terminal 10, the personal set temperature can be used as the above-mentioned past personal set temperature.

The first change button 603 is a button for lowering the personal set temperature of the target user displayed in the set temperature display area 602 by, for example, 1° C. In the example shown in FIG. 13, when the operation of touching the first change button 603 is performed by the target user, the personal set temperature of the target user displayed in the set temperature display area 602 is changed from 27° C. to 26° C.

The second change button 604 is a button for raising the personal set temperature of the target user displayed in the set temperature display area 602 by, for example, 1° C. In the example shown in FIG. 13, when the operation of touching the second change button 604 is performed by the target user, the personal set temperature of the target user displayed in the set temperature display area 602 is changed from 27° C. to 28° C.

The range (lower limit and upper limit) of the personal set temperature that can be changed using the above-mentioned first change button 603 and second change button 604 is the same as the range of the value that can be taken by the set temperature included in the above-mentioned air conditioner information. In addition, the interval of the set temperature changed by using the above-mentioned first change button 603 and second change button 604 (for example, in increments of 1° C.) also follows the air conditioner information.

In the present embodiment, when it is set that the target user has entered the target room 50 according to the operation of the target user on the setting screen 600 (entry/exit changeover switch 601), the determination module 102 included in the user terminal 10 determines that the target user has entered the target room 50.

In this case, the setting module 103 sets the personal set temperature displayed in the set temperature display area 602 as the personal set temperature of the target user. The personal set temperature set by the setting module 103 may be the above-mentioned default personal set temperature, the past personal set temperature, or the personal set temperature after being changed from these personal set temperatures by using the first change button 603 and the second change button 604.

Here, although the method in which the user directly inputs (sets) his/her own personal set temperature by changing the temperature displayed in the set temperature display area 602 has been described, for example, the setting screen 600 may not include the set temperature display area 602, the raising/lowering direction of the set temperature may be acquired only from the operation of the user on the first change button 603 and the second change button 604, and the personal set temperature may be calculated and set by the following equation.

$$P \leftarrow f(T_0, F_0) + \Delta t$$

In this equation, P is the personal set temperature of the target user. $f(T_0, F_0)$ corresponds to a temperature estimation model for estimating the temperature of the indoor zone to which the target user belongs when the operation of the air conditioner 40 is controlled based on the current (previous) set temperature and air direction. $\Delta t$ is −1 when the operation of touching the first change button 603 is performed once by the target user, and +1 when the operation of touching the second change button 604 is performed once. That is, $\Delta t$ may vary depending on the number of operations of touching the first change button 603 or the second change button 604. Further, "←" the above equation indicates that the value on the left side is updated with the value on the right side of the equation.

The personal set temperature of the target user set by the setting module 103 as described above is transmitted from the user terminal 10 to the setting control device 20 together with the user ID for identifying the target user (hereinafter referred to as a target user ID).

When the personal set temperature of the target user is set in the user terminal 10 in this way and the personal set temperature is transmitted from the user terminal 10 to the setting control device 20, the process shown in FIG. 12 is executed in the setting control device 20.

First, the terminal processing module 205 receives the target user ID and the personal set temperature transmitted from the user terminal 10 (step S1). The target user ID and the personal set temperature of the target user received in step S1 are stored in the personal set temperature storage 206 in association with each other. The personal set temperature storage 206 also stores the personal set temperatures of other users in the target room 50.

Next, the user position acquisition module 207 acquires the position of the target user in the target room 50 (step S2). The position of the target user acquired in step S2 is represented by the x, y coordinates on the target room 50 (map) similar to the above-mentioned indoor map information.

When the smartphone is used as the user terminal 10 as described above, the position of the target user may be acquired by using the GPS function of the smartphone, or may be acquired based on a beacon signal received from the terminal arranged in the target room 50. Further, the position of the target user may be acquired by using an infrared sensor (human sensor). The position of the target user may be acquired by using another sensor or the like.

On the other hand, for example, when the target room 50 is an office or the like and the position of the target user is fixed due to the arrangement of desks or the like, the fixed position may be acquired as the position of the target user. When the position of the target user is fixed, the setting control device 20 may hold the position of the target user associated with the target user ID in advance.

Further, it is also possible to acquire the position of the target user by, for example, displaying a map indicated by indoor map information as shown in FIG. 9 on the user terminal 10, and causing the target user to designate the position of the target user on the map.

In the present embodiment, it has been described that whether or not the target user has entered the target room 50 is determined in the user terminal 10 according to the operation of the target user on the setting screen 600 as described above. However, when the position of the target user is acquired by using the GPS function, the beacon signal, the infrared sensor, etc., as described above, whether or not the target user has entered the target room 50 may be determined based on the position of the target user. According to this, it is possible to realize a configuration in which the air-conditioning application is automatically activated on the user terminal 10 when it is determined that the target user has entered the target room 50.

The user position information indicating the position of the target user acquired in step S2 is stored in the user position information storage 208 in association with the target user ID. The user position information storage 208 also stores user position information indicating the positions of other users in the target room 50.

Next, the determination module 210 executes a process of optimizing (hereinafter referred to as an optimization process) the set values of the air conditioner 40 based on the set of the personal set temperature and the position of the target user and the set of the personal set temperature and the position of the other user (step S3). In this optimization process, the optimum set values are determined from the ranges of the values that can be taken by the set temperature and the air direction indicated by the above-mentioned air conditioner information. In the present embodiment, the optimum set values refer to set values that can improve or maintain the comfort level of the target user and the other user in the room.

Hereinafter, the optimization process will be specifically described. In the optimization process, the setting of the air conditioner 40 is optimized based on the difference between the personal set temperature of the target user and the estimated temperature of the indoor zone to which the target user belongs, and the difference between the personal set temperature of the other user and the estimated temperature of the indoor zone to which the other user belongs. Specifically, the optimization process is executed using Equation (1) below.

$$T^*, F^* = \text{argmin}_{T,F} \sum_{k \in K} w_k \cdot |P_k - f_k(T, F)|^2 \quad \text{Equation (1)}$$

Here, in Equation (1) above, K indicates a set of users who are (in the room) in the target room 50. In addition, $P_k$ indicates the personal set temperature of the user k. $w_k$ is the weight of the user k.

Further, T represents the set temperature of the air conditioner 40. F represents the direction of the air blown from each of the four outlets 401 to 404 provided in the air conditioner 40 (that is, the air direction of each of the outlets 401 to 404). That is, in Equation (1), $f_k(T, F)$ corresponds to a temperature estimation model for estimating the temperature of the indoor zone to which the user k belongs when the operation of the air conditioner 40 is controlled based on (the set values including) the set temperature T and the air direction F. T* and F* indicate the optimized set values (set temperature and air direction).

Here, the temperature estimated by using the temperature estimation model (estimated temperature) is different from the personal set temperature. In the present embodiment, the set values of the air conditioner 40 that allow the temperature estimated by using this temperature estimation model to approach the personal set temperature are searched. Specifically, according to Equation (1), the combination of the set temperature T and the air directions F (F (d1) to F (d4)) of the outlets 401 to 404 that allows the weight sum of the square error of the personal set temperature $P_k$ of the user k and the estimated temperature $f_k(T, F)$ of the indoor zone to which the user k belongs to be closest to 0 is determined as the optimum set values.

$P_k$ is a personal set temperature associated with the user ID for identifying the user k, and can be acquired from the personal set temperature storage 206. T and F are variables. $f_k(T, F)$ can be acquired from the temperature estimation model storage 209. The indoor zone to which the user k belongs can be specified from the indoor zone information (x, y coordinates of each indoor zone) stored in the indoor zone information storage 204 and the user position information (x, y coordinates of the user k) stored in the user position information storage 208 in association with the user ID for identifying the user k.

Further, the weight $w_k$ in Equation (1) above can be any value. For example, assuming that the weight $w_k$ is 1 for all the users k, it is just a square error. On the other hand, if time has passed since the personal set temperature is set, it can be considered that the reliability of the personal set temperature has decreased. Therefore, it is also possible to perform a correction so as to reduce $w_k$ according to the elapsed time after the personal set temperature is set. According to this, it is possible to obtain set values (optimization process result) that place more importance on the personal set temperature of the latest user. In the case of such a configuration, the time when the personal set temperature is set may be stored in the personal set temperature storage 206 together with the personal set temperature.

In the optimization process, for example, Equation (1) is calculated for all combinations of T and F, and the set values (combination of T and F) that minimizes the value (sum of the square error) in the calculation result is determined. However, if the number of combinations of T and F is enormous and the amount of processing is large, a mathematical programming solver such as Gurobi Optimizer or CPLEX may be used, or a metaheuristic solution such as Simulated Annealing or Genetic Algorithm may be used. In this case, an optimum solution or a quasi-optimal solution can be obtained while reducing the amount of processing.

In the present embodiment, it has been described that the set values of the air conditioner 40 are optimized by using Equation (1), but Equation (1) is an example, and other error evaluation equations may be used.

Further, for example, in order to avoid a situation in which the set values of the air conditioner 40 change drastically depending on the personal set temperature of a specific user, a constraint condition that reduces the difference between the previous set values $T_0$ and $F_0$ of the air conditioner 40 and the new set values T and F of the air conditioner 40 may be added. In this case, Equation (2) below can be used instead of Equation (1) above.

$$T^*, F^* = \text{argmin}_{T,F} \sum_{k \in K} w_k \cdot |P_k - f_k(T, F)|2 + |T - T_0|^2 + |F - F_0|^2 \quad \text{Equation (2)}$$

When the process of step S3 is executed, the set values T* and F* of the air conditioner 40 optimized (determined) in the processing of step S3 are transmitted from the setting control device 20 to the air-conditioning control device 30 (step S4). As a result, the air-conditioning control device 30 can control the operation of the air conditioner 40 based on the set values of the air conditioner 40 transmitted in step S4.

Although the process shown in FIG. 12 has been described as being executed when the target user has entered the target room 50, the process is also executed in the same way when the target user (or the other user) in the target room 50 changes the personal set temperature, for example.

Further, the above-mentioned optimization process is also executed when the target user (or the other user) in the target room 50 has left the room. The exit of the target user from the target room 50 may be determined according to the operation of the target user on the setting screen (entry/exit changeover switch 601) displayed on the user terminal 10 in the same manner as when the target user has entered the target room 50.

If the target user does not perform the operation on the setting screen even though the target user has left the room (that is, if the target user forgets to set that he/she has left the room), the set values of the air conditioner 40 are optimized based on the personal set temperature of the target user who has already left the room. Therefore, as described above, the exit of the target user may be automatically determined by using the GPS function, the beacon signal, the infrared sensor, etc. According to such a configuration, even if the user forgets to set that he/she has left the room, it is possible to perform appropriate an optimization process.

When it is determined that the target user has left the room as described above, the user terminal 10 notifies the setting control device 20 that the target user has left the room. In this case, after the setting control device 20 discards the personal set temperature of the target user stored in the personal set temperature storage 206 and the user position information indicating the position of the target user stored in the user position information storage 208, the setting control device 20 executes a process subsequent to step S3 shown in FIG. 12 by using the personal set temperature of the other user (user in the target room 50) stored in the personal set temperature storage 206 and the user position information indicating the position of the other user (user in the target room 50) stored in the user position information storage 208.

Further, when the target user (or the other user) moves in the target room 50 (that is, the position of the user is changed), the process subsequent to step S2 shown in FIG. 12 is executed. The position of the target user after movement may be acquired by using the GPS function, the beacon signal, and the infrared sensor described above, or may be designated by the target user on the user terminal 10.

That is, in the present embodiment, the above-mentioned optimization process may be executed every time the state (situation) of the target room 50 changes due to a change in the personal set temperature, entry/exit of the user, movement of the user, or the like.

In the present embodiment, it has been described that the indoor zones 501 to 504 are defined in advance before the process of FIG. 12 referred to above is executed, but the indoor zones may be defined based on the respective positions of the users (the target user and the other user in the target room 50) stored in the user position information storage 208 after the process of step S2 shown in FIG. 12 is executed. In this case, for example, a plurality of indoor zones may be defined such that the plurality of users in the target room 50 belong to different indoor zones, respectively.

Hereinafter, the operation of the air-conditioning system according to the present embodiment will be specifically described with reference to FIG. 14. Here, the air conditioner 40 performs the heating operation, and the set temperature (18° C. to 28° C. in increments of 1° C.) and the air directions in four directions (three levels of "horizontal", "middle", and "down") are optimized as the set values of the air conditioner 40. Moreover, T (A)+0.5F (d) is used as a temperature estimation model. Further, the positional relationship between the air conditioner 40, the target room 50, and the indoor zones 501 to 504 is as shown in FIG. 10 and the like referred to above.

Here, it is assumed that the state of the target room 50 changes from a first state to a fourth state. In FIG. 14, the numerical value shown near each user indicates the personal set temperature of the user. Further, in FIG. 14, the numerical value shown with an outer frame near each of the indoor zones 501 to 504 indicates the estimated temperature of each of the indoor zones 501 to 504. Further, FIG. 15 shows the set values of the air conditioner 40 optimized in each of the first to fourth states described in FIG. 14.

Figure 14:
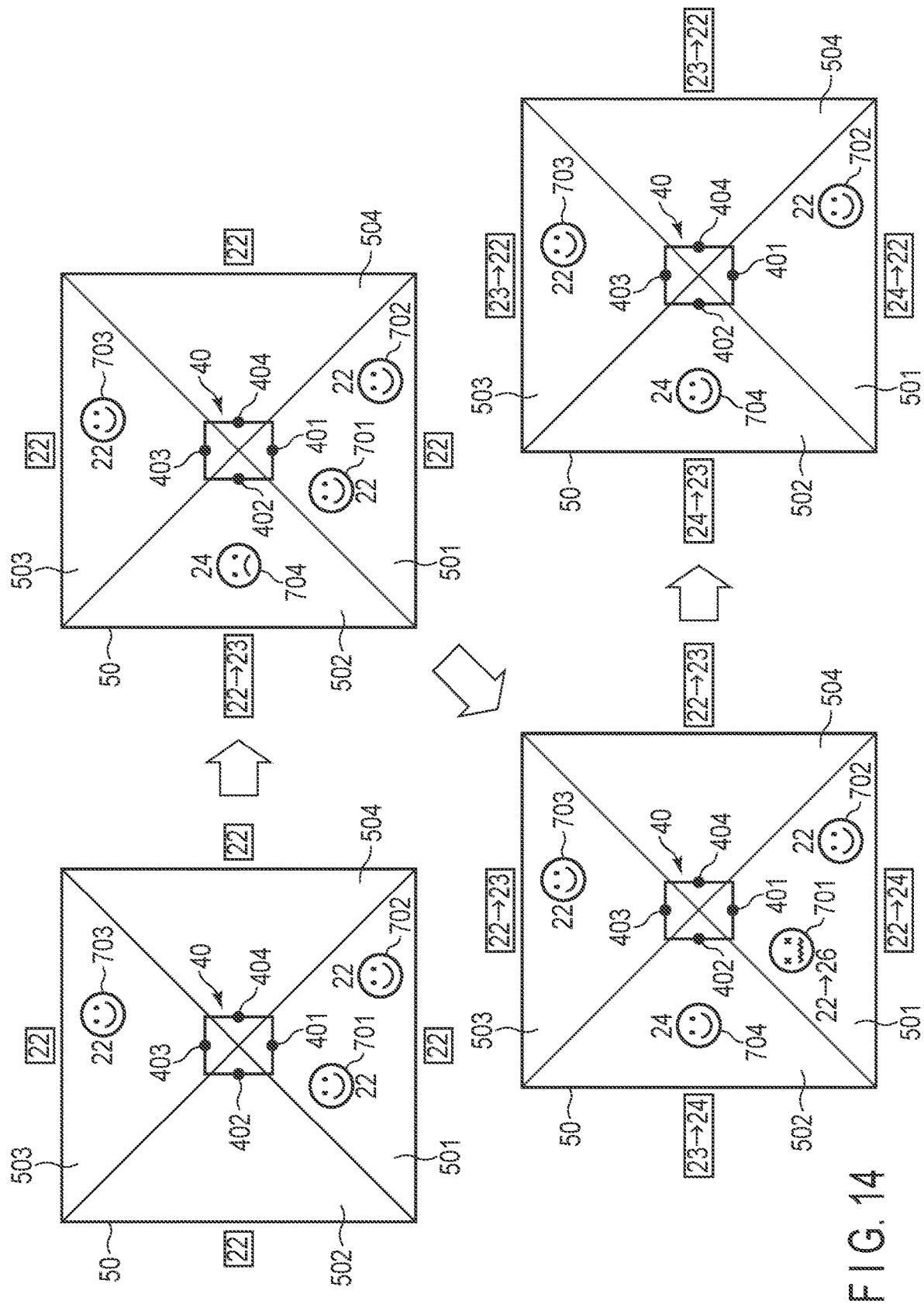
FIG. 14 is a diagram for specifically explaining an operation of the air-conditioning system.

First, in the first state shown on the upper left side of FIG. 14, users 701 and 702 are in the indoor zone 501 and a user 703 is in the indoor zone 503. Further, as shown in FIG. 15, the set temperature of the air conditioner 40 at this time is 22° C., and the air directions of the outlets 401 to 404 are all "horizontal". Further, in this case, the personal set temperatures of the users 701 to 703 are all 22° C. Furthermore, the estimated temperatures of the indoor zones 501 and 504 are all 22° C. In this first state, the users 701 to 703 feel generally comfortable.

Next, it is assumed that the user 704 enters the indoor zone 502 and the state transitions from the first state shown on the upper left side of FIG. 14 to the second state shown on the upper right side of FIG. 14. The user 704 feels cold and the personal set temperature of the user 704 is 24° C.

Here, the optimization process executed when the state transitions from the first state to the second state will be specifically described.

In the second state, assuming that the set K of the users 701 to 704 in Equation (1) above={1, 2, 3, 4} and the personal set temperatures of the users 701 to 704 are $P_1$ to $P_4$, $P_1$=22, $P_2$=22, $P_3$=22, and $P_4$=24. Further, as described above, the users 701 and 702 are in the indoor zone 501, the user 703 is in the indoor zone 503, and the user 704 is in the indoor zone 502.

In this case, assuming that the set temperature of the air conditioner 40 is T (A) and the air directions of the outlets 401 to 404 corresponding to the indoor zones 501 to 504 are F (d1) to F (d4), respectively, the estimated temperature of the indoor zone 501 where the users 701 and 702 are present is represented by:

$$f_1 = f_2 = T(A) + 0.5F(d1).$$

Similarly, the estimated temperature of the indoor zone 503 where the user 703 is present is represented by:

$$f_3 = T(A) + 0.5F(d3).$$

In addition, the estimated temperature of the indoor zone 502 where the user 704 is present is represented by:

$$f_4 = T(A) + 0.5F(d2).$$

When Equation (1) is solved (optimization process is executed) under the above conditions, assuming that T=22, F (d1)=0, F (d2)=2, F (d3)=0, and F (d4)=0, the sum of the square error of each of the personal set temperatures $P_1$ to $P_4$ of the users 701 to 704 and each of the estimated temperatures of the indoor zones where the users 701 to 704 are present is minimized. In this case, as the optimum set values in the second state, the set temperature T*=22° C., the air direction F* (d1) of the outlet 401=0, the air direction F* (d2) of the outlet 402=2, the air direction F* (d3) of the outlet 403=0, and the air direction F* (d4) of the outlet 404=0 can be obtained. Since there is no user in the indoor zone 504, F* (d4) may be any value other than "horizontal (0)".

Therefore, in the above-mentioned second state, the air direction of the second outlet 402 corresponding to the indoor zone 502 is changed from "horizontal" to "down" while maintaining the set temperature at 22° C. as shown in FIG. 15, and then the air conditioner 40 is operated. According to this, the estimated temperature of the indoor zone 502 where the user 704 is present rises from 22° C. to 23° C., and the estimated temperature of the indoor zone 502 can be brought closer to the personal set temperature $P_4$ of the user 704.

Next, it is assumed that the user 701 in the indoor zone 501 feels very cold, and the personal set temperature $P_1$ of the user 701 is changed from 22° C. to 26° C., so that the state transitions from the second state shown on the upper right side shown in FIG. 14 to the third state shown on the lower left side of FIG. 14.

As described above, the details of the optimization process executed when the state transitions from the second state to the third state will be omitted, but in this case, as shown in FIG. 15, the set temperature is changed from 22° C. to 23° C., and further, the air direction of the outlet 401 corresponding to the indoor zone 501 where the user 701 (and 702) is present is changed from "horizontal" to "down". According to this, the estimated temperature of the indoor zone 501 where the user 701 is present rises from 22° C. to 24° C., and the estimated temperature of the indoor zone 501 can be brought closer to the personal set temperature $P_1$ of the user 701. In this case, the estimated temperature of the indoor zone 502 also rises from 23° C. to 24° C., so that the comfort level of the user 704 can also be improved.

Next, it is assumed that the user 701 has left the indoor zone 501 and the state transitions from the third state shown on the lower left side of FIG. 14 to the fourth state shown on the lower right side of FIG. 14.

In this case, the optimization process is executed using the personal set temperatures $P_2$ to $P_4$ of the users 702 to 704, and the set values of the air conditioner 40 become the same as the second state described above as a result. According to this, it is possible to improve the comfort level of the users 702 and 703 while maintaining the comfort level of the user 704 to some extent.

As described above, in the present embodiment, the user terminal 10 (first terminal device) receives the personal set temperature (first personal set temperature) set by the target user (first user), the other user terminal 10 (second terminal device) receives the personal set temperature (second personal set temperature) set by the other user (second user), and the optimum set values of the air conditioner 40 are determined (that is, the set values are optimized) based on the received personal set temperature of the target user and the received personal set temperature of the other user.

In the present embodiment, the air conditioner 40 includes the four outlets 401 to 404 for blowing air in four directions and is configured to control (the directions of) the air blown from the outlets 401 to 404 for each outlet. In this case, the temperature (first temperature) of the indoor zone specified (selected) based on the position of the target user among the plurality of indoor zones 501 to 504 (areas) is estimated using the temperature estimation model (first temperature estimation model) prepared in advance, and the temperature (second temperature) of the indoor zone specified (selected) based on the position of the other user among the plurality of indoor zones 501 to 504 is estimated using the temperature estimation model. In the present embodiment, the set values of the air conditioner 40 are determined based on the difference between the estimated temperature of the indoor zone specified based on the position of the target user and the personal set temperature of the target user, and the difference between the estimated temperature of the indoor zone specified based on the position of the other user and the personal set temperature of the other user.

Here, for example, when the state of the target room 50 changes as shown in FIG. 14 referred to above, it is extremely difficult to perform an operation (instruction) for controlling the operation of the air conditioner 40 so as to maintain or improve the comfort level of all the plurality of users 701 to 704 in the target room 50, for example, with one remote controller corresponding to the air conditioner 40. Specifically, when the remote controller is shared by the plurality of users 701 to 704 in this way, for example, it is assumed that the user 704 performs an operation of raising the set temperature of the air conditioner 40 in the second state described with reference to FIG. 14. Similarly, it is assumed that the user 701 performs an operation of extremely raising the set temperature of the air conditioner 40 in the third state described with reference to FIG. 14. When such an operation is performed by the remote controller, the other users 702 and 703 feel hot, so that the set temperature of the air conditioner 40 is lowered by the remote controller. When such a remote control operation is frequently performed, a situation is repeated in which some of the plurality of users 701 to 704 in the target room 50 always feel uncomfortable.

On the other hand, according to the present embodiment, in the second state shown in FIG. 14 referred to above, only the air direction of the outlet 402 corresponding to the indoor zone 502 where the user 704 is present is changed, so that the comfort level of the other users 701 to 703 can be maintained while improving the comfort level of the user 704.

Further, according to the present embodiment, even when the personal set temperature of the user 701 rises extremely as in the third state shown in FIG. 14 referred to above, a situation in which the set temperature of the air conditioner 40 is significantly raised is avoided, and it is possible to ensure a degree of comfort level that all the users 701 to 704 do not feel uncomfortable.

That is, in the present embodiment, the above-described configuration makes it possible to improve the comfort level of the plurality of users (target user and other user) present in the same room.

In the present embodiment, the case where one air conditioner 40 is installed in the target room 50 has been described, but a plurality of air conditioners 40 may be installed in the target room 50. Even in this case, the same process as that shown in FIG. 12 may be executed.

Figure 16:
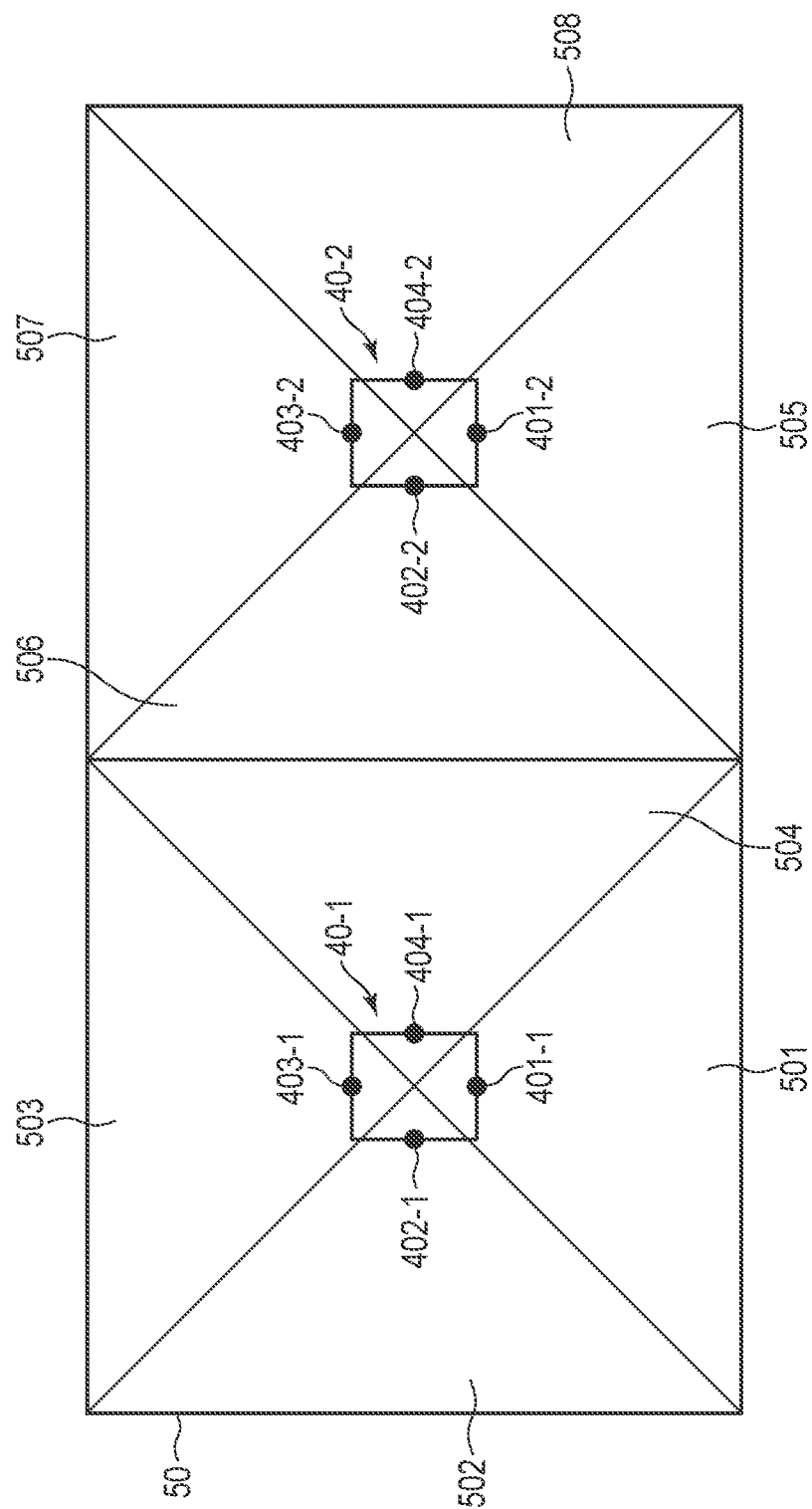
FIG. 16 is a diagram for explaining a case where a plurality of air conditioners are installed in a room.

Specifically, as shown in FIG. 16, for example, two air conditioners 40-1 and 40-2 are installed in the target room 50. The air conditioner 40-1 includes outlets 401-1 to 404-1. Further, the air conditioner 40-2 includes outlets 401-2 to 404-2. In this case, the target room 50 is divided into eight indoor zones 501 to 508 as shown in FIG. 16.

Here, the air conditioner 40-1 shown in FIG. 16 is A, the air conditioner 40-2 is B, the set temperature of the air conditioner 40-1 is T (A), and the set temperature of the air conditioner 40-2 is T (B). Further, the air directions of the respective outlets 401-1 to 404-1 provided in the air conditioner 40-1 are FA (d1), FA (d2), FA (d3), and FA (d4), and the air directions of the respective outlets 401-2 to 404-2 provided in the air conditioner 40-2 are FB (d1), FB (d2), FB (d3), and FB (d4).

In the optimization process in this case, the combination of the set temperature T (A) of the air conditioner 40-1, the set temperature T (B) of the air conditioner 40-2, the air directions FA (d1) to FA (d4) of the four outlets 401-1 to 404-1 provided in the air conditioner 40-1, and the air directions FB (d1) to FB (d4) of the four outlets 401-2 to 404-2 provided in the air conditioner 40-2 that allows the weight sum of the square error of the personal set temperature of each user k in the target room 50 and the estimated temperature of the indoor zone to which the user k belongs among the indoor zones 501 to 508 to be closest to 0 is determined as the optimum set values.

Even when the plurality of air conditioners 40 are installed in the target room 50 as described above, the set values of the plurality of air conditioners 40 can be optimized by executing the same process as the process described in the present embodiment. The set values of the plurality of air conditioners 40 when the plurality of air conditioners 40 are installed in the target room 50 may include turning on/off the power of one of the plurality of air conditioners 40.

Further, in the present embodiment, it has been described that the set values of the air conditioner 40 include the set temperature and the air directions of the four outlets 401 to 404, but the set values of the air conditioner 40 may further include, for example, the amounts of air blown from the outlets 401 to 404 (that is, the air amounts from the outlets 401 to 404). In this case, the temperature estimation model described above may include a variable representing the air amounts from the outlets 401 to 404.

Further, the set values of the air conditioner 40 described above may be changed (selected) as appropriate. That is, the set values of the air conditioner 40 in the present embodiment may include at least one of the set temperature of the air conditioner 40, the air directions of the outlets 401 to 404, and the air amounts from the outlets 401 to 404.

Further, in the present embodiment, it has been described that the set values that allow the sum of square error (weight sum) of the personal set temperature of the user and the estimated temperature of the indoor zone to which the user belongs to be closest to 0 are determined by using Equation (1) above, a condition may be set for the determined set values.

Specifically, for example, the condition may be set such that the air direction of at least one of the outlets 401 to 404 provided in the air conditioner 40 (for example, the outlet 401) is set to only "horizontal" or "middle" (that is, not set to "down"). Under such a condition, it is possible to avoid direct blow of air to the user in a specific indoor zone.

Further, when the plurality of air conditioners 40-1 and 40-2 are installed in the target room 50 as shown in FIG. 16 referred to above, for example, the condition may be set such that the air direction of the outlet 404-1 that blows air toward the air conditioner 40-2 among the four outlets 401-1 to 404-1 provided in the air conditioner 40-1 and the air direction of the outlet 402-2 that blows air toward the air conditioner 40-1 among the four outlets 401-2 to 404-2 provided in the air conditioner 40-2 are not set to "horizontal" at the same time. Under such a condition, it is possible to avoid a situation in which the air blown from the air conditioner 40-1 and the air blown from the air conditioner 40-2 interfere with each other to degrade the operating efficiency (heating efficiency or cooling efficiency). Further, the condition may be set such that the difference between the set temperature of the air conditioner 40-1 and the set temperature of the air conditioner 40-2 is not set to a predetermined value (for example, 5° C.) or larger. Under such a condition, waste of energy can be avoided.

When the condition is set as described above, the set values that satisfy the condition and allow the sum of the square error (weight sum) of the personal set temperature of the user and the estimated temperature of the indoor zone to which the user belongs to be closest to 0 may be determined in the optimization process.

The condition described above may include, for example, when the plurality of air conditioners 40-1 and 40-2 are installed in the target room 50, a condition (recommended condition) such as turning off the power of at least one of the plurality of air conditioners 40-1 and 40-2 when the power of the air conditioner can be turned off. That is, by registering a more preferable condition for the set values from the viewpoint of energy saving or comfort, weighting may be performed so that the set values (registered solution) are preferentially determined in the optimization process.

Further, in the present embodiment, the user can set the personal set temperature on the setting screen 600 displayed on the user terminal 10, and the optimum set values of the air conditioner 40 are determined based on the personal set temperature of the user and the personal set temperature of the other user. According to the example shown in FIG. 13, the user can easily confirm the personal set temperature set by himself/herself on the setting screen 600.

Here, although the setting of the personal set temperature has been mainly described in FIG. 13, other information may be displayed on the setting screen 600.

Hereinafter, an example of the processing procedure of the air-conditioning system (user terminal 10 and setting control device 20) when a setting screen different from that of FIG. 13 is displayed will be described with reference to the sequence chart of FIG. 17.

Figure 17:
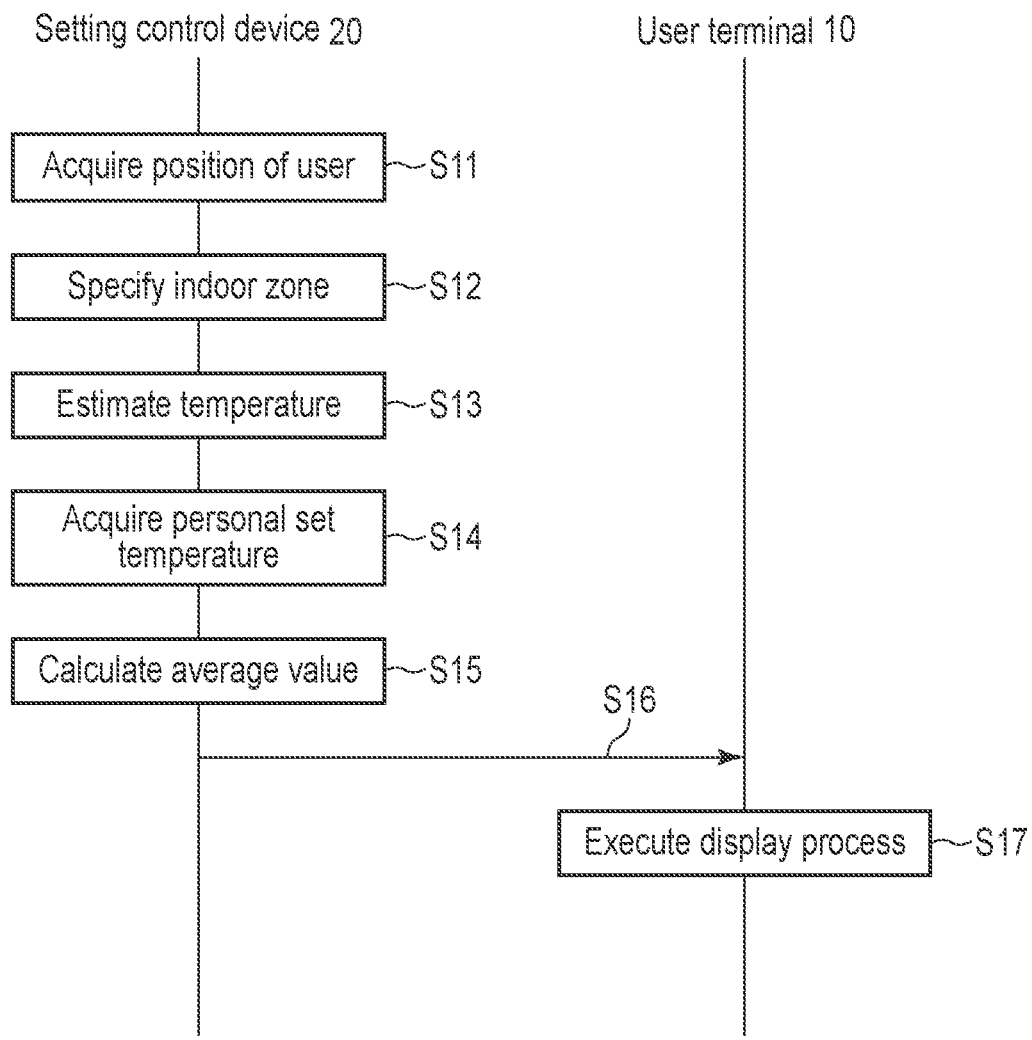
FIG. 17 is a sequence chart showing an example of a processing procedure of the air-conditioning system when a setting screen is displayed.

The process shown in FIG. 17 may be executed, for example, when the user gives an instruction via the user terminal 10, or when the air-conditioning application is activated on the user terminal 10 described above (that is, before the process shown in FIG. 12 is executed).

Here, a user who uses the user terminal 10 on which the setting screen is displayed will be described as a target user.

First, the user position acquisition module 207 acquires the position of the target user (step S11). Since the process of step S11 is the same as the process of step S2 shown in FIG. 12 referred to above, detailed description thereof will be omitted here, but for example, when the process of step S2 has already been executed, the position of the target user may be acquired from the user position information stored in the user position information storage 208.

Next, the terminal processing module 205 specifies the indoor zone to which the target user belongs based on the position of the target user acquired in step S11 and the indoor zone information stored in the indoor zone information storage 204 (step S12).

The terminal processing module 205 estimates the temperature of the indoor zone to which the target user belongs by using the temperature estimation model stored in the temperature estimation model storage 209 (step S13). The temperature estimated in step S13 is a temperature corresponding to the current set values of the air conditioner 40, and can be obtained by applying the current set temperature and air direction of the air conditioner 40 to the temperature estimation model described above. Since the temperature estimation model is as described above, detailed description thereof will be omitted here.

Further, the terminal processing module 205 acquires the personal set temperature of the other user from the personal set temperature storage 206 (step S14). The personal set temperature acquired in step S14 may be personal set temperatures of all other users in the target room 50, or the personal set temperature of the other user who belongs to the same indoor zone as the target user.

The terminal processing module 205 calculates the average value of the personal set temperatures acquired in step S14 (step S15). In the present embodiment, it is described that the average value is calculated in step S15, but in step S15, other values such as the median value or the mode value may be calculated. In other words, in step S15, the representative value of the personal set temperatures acquired in step S14 may be calculated (acquired).

The temperature estimated in step S12 (estimated temperature) and the average value calculated in step S15 (average set temperature) are transmitted to the user terminal 10 (step S16).

As a result, the display processing module 101 included in the user terminal 10 executes a process (display process) of displaying the estimated temperature and the average set temperature transmitted in step S16 on the setting screen (step S17).

Here, FIG. 18 shows an example of a setting screen displayed on the user terminal 10 when the process shown in FIG. 17 referred to above is executed.

Unlike the setting screen 600 shown in FIG. 13 referred to above, the setting screen 600 shown in FIG. 18 is further provided with an estimated temperature display area 605 and an average set temperature display area 606.

The estimated temperature display area 605 is an area in which the temperature estimated in step S13 shown in FIG. 17 referred to above, that is, the estimated ambient temperature of the target user is displayed.

Further, the average set temperature display area 606 is an area in which the average value calculated in step S15 shown in FIG. 17 referred to above, that is, the average value of the personal set temperatures of other users is displayed. In the average set temperature display area 606, the representative value (median value, mode value, etc.) other than the average value may be displayed as described above.

When the setting screen 600 shown in FIG. 18 is displayed, the target user can easily grasp the surrounding conditions (estimated ambient temperature and average set temperature of other users), which can be used as a guide when the personal set temperature of the target user is set (determined). Further, by displaying such a setting screen 600, it is possible to prevent, for example, the target user from setting a personal set temperature that is extremely different from the other user, and it is possible to avoid such a situation that the other user is affected more than necessary by the personal set temperature of the target user.

Although the example in which both the estimated ambient temperature and the average set temperature of the other users are displayed has been described in FIG. 18, only one of the estimated ambient temperature and the average set temperature of the other users may be displayed. When only the estimated ambient temperature is displayed on the setting screen, the processes of steps S14 and S15 shown in FIG. 17 may be omitted. Further, when only the average set temperature of the other users is displayed on the setting screen, the process of step S13 shown in FIG. 17 may be omitted.

Further, in FIG. 18, it has been described that the average set temperature of the other users is displayed, but when the number of the other users is small, the personal set temperature of the other user may be displayed as it is instead of displaying the average set temperature (average value). Further, as shown in FIG. 19, for example, the degree of deviation (difference) between the personal set temperature of the target user and the average set temperature of the other users may be displayed in the average set temperature display area 606. In the example shown in FIG. 19, the degree of deviation between the personal set temperature of the target user and the average set temperature of the other users is displayed using a figure. According to this, the target user can intuitively grasp that the personal set temperature of the target user is 1° C. higher than the average set temperature of the other users.

In the present embodiment, it has been described that the air conditioner 40 includes the four outlets 401 to 404 for blowing air in four directions, but the air conditioner 40 may include at least two outlets and be configured to control (the directions and the amounts of) the air blown from at least the two outlets for each outlet.

Further, for example, in the case where the air conditioner 40 includes only one outlet, the present embodiment can be applied if a plurality of the air conditioners 40 are installed in the target room 50.

Further, in the present embodiment, the setting control device 20 has been described as one device, but the setting control device 20 may be configured integrally with the air-conditioning control device 30 as described above, or may include a plurality of devices in which these modules 201 to 211 shown in FIG. 5 are arranged in a distributed manner. Further, at least some of the storage 201, 202, 204, 206, 208, and 209 shown in FIG. 5 may be arranged in an external server device or the like which is separate from the setting control device 20.

Second Embodiment

Next, a second embodiment will be described. First, the outline of an air-conditioning system according to the present embodiment will be described with reference to FIG. 20.

Figure 20:
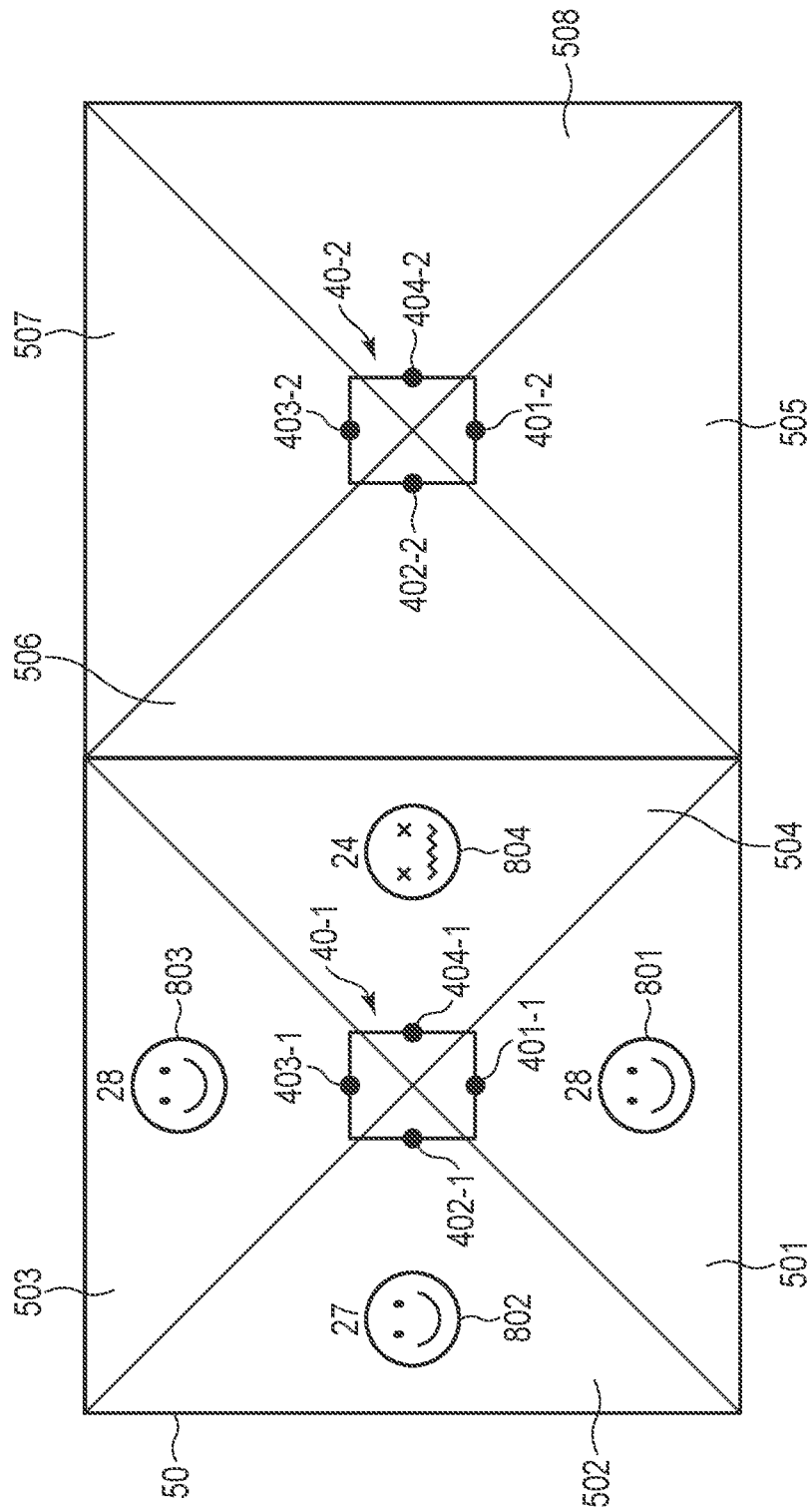
FIG. 20 is a diagram for explaining the outline of an air-conditioning system according to a second embodiment.

Note that FIG. 20 shows positions of air conditioners, indoor zones, and users on a map of a target room 50.

In the present embodiment, as described with reference to FIG. 16 referred to above, it is assumed that a plurality of air conditioners 40-1 and 40-2 are installed in the target room 50. In this case, the air conditioner 40-1 includes outlets 401-1 to 404-1. In addition, the air conditioner 40-2 includes outlets 401-2 to 404-2.

Further, the target room 50 is divided into indoor zones 501 to 508 based on the positions of the outlets 401-1 to 404-1 provided in the air conditioner 40-1 and the outlets 401-2 to 404-2 provided in the air conditioner 40-2. In other words, the area around the air conditioner 40-1 in the target room 50 is divided into the indoor zones 501 to 504 (plurality of areas), and the area around the air conditioner 40-2 is divided into the indoor zones 505 to 508 (plurality of areas). The indoor zones 501 to 508 may be defined based on the Voronoi tessellation described in the first embodiment described above.

Here, users 801 to 804 are present in the indoor zones 501 to 504 in the target room 50 in which only the air conditioner 40-1 is performing a cooling operation with power of the air conditioner 40-2 turned off. In this case, it is assumed that the personal set temperature of the user 801 is 28° C., the personal set temperature of the user 802 is 27° C., the personal set temperature of the user 803 is 28° C., and the personal set temperature of the user 804 is 24° C.

That is, in FIG. 20, it is indicated that the users 801 to 803 feel relatively comfortable, whereas only the user 804 present near the boundary between the indoor zone on the air conditioner 40-1 side and the indoor zone on the air conditioner 40-2 side feels very hot.

Figure 21:
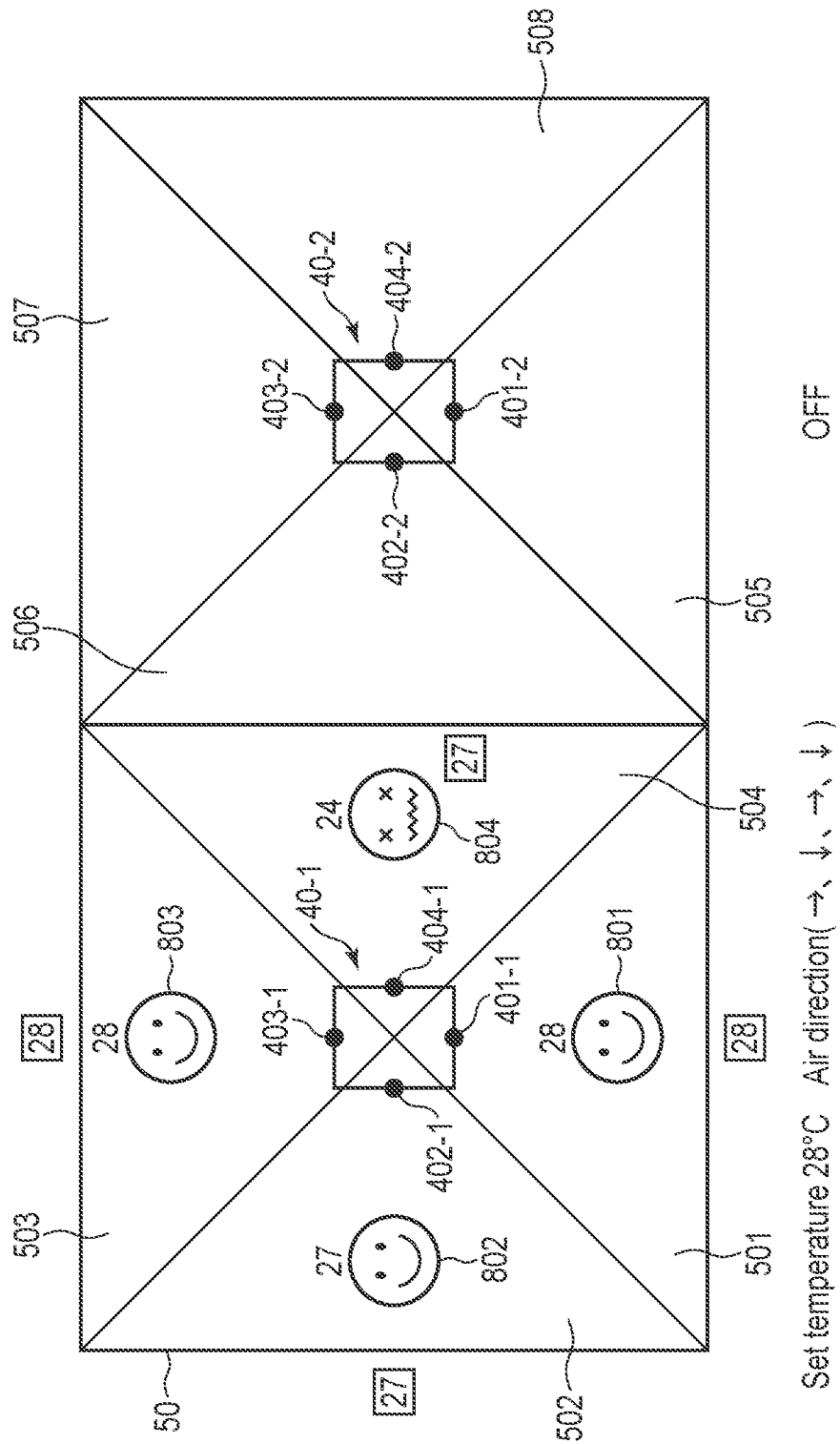
FIG. 21 is a diagram for explaining a comparative example of the present embodiment.

FIG. 21 shows the result of executing the optimization process described in the first embodiment described above in the state shown in FIG. 20 referred to above as a comparative example of the present embodiment. The set temperature of the air conditioner 40-1 optimized by this optimization process is 28° C., and the air directions of the outlets 401-1 to 404-1 are "horizontal", "down", "horizontal", and "down".

That is, since the personal set temperatures of the respective users 801 to 803 are 27° C. or 28° C., the set temperature of the air conditioner 40-1 cannot be lowered even if the optimization process described in the first embodiment described above is executed. In this case, in order to lower the estimated temperature of the indoor zone 504 to which the user 804 belongs, the air direction of the outlet 404-1 is set to "down", but the estimated temperature of the indoor zone 504 cannot be lowered below 27° C. This estimated temperature has a large difference from the personal set temperature (24° C.) of the user 804, and the comfort level of the user 804 cannot be sufficiently improved.

Therefore, in the present embodiment, when the temperature of the indoor zone near the boundary between the indoor zone on the air conditioner 40-1 side and the indoor zone on the air conditioner 40-2 side (for example, indoor zones 504 and 506, etc.) is estimated, a temperature estimation model different from the temperature estimation model $f(A, d) = T(A) - F(d)$ described in the first embodiment described above is used. In particular, $$f(A,d) = 0.5 \times (T(A) + T(B)) - 0.25 \times (FA(d4) + FB(d2))$$

is used. In this temperature estimation model, T (A) is the set temperature of the air conditioner 40-1, and T (B) is the set temperature of the air conditioner 40-2. Further, FA (d4) is the air direction of the outlet 404-1 provided in the air conditioner 40-1, and FB (d2) is the air direction of the outlet 402-2 provided in the air conditioner 40-2.

Figure 22:
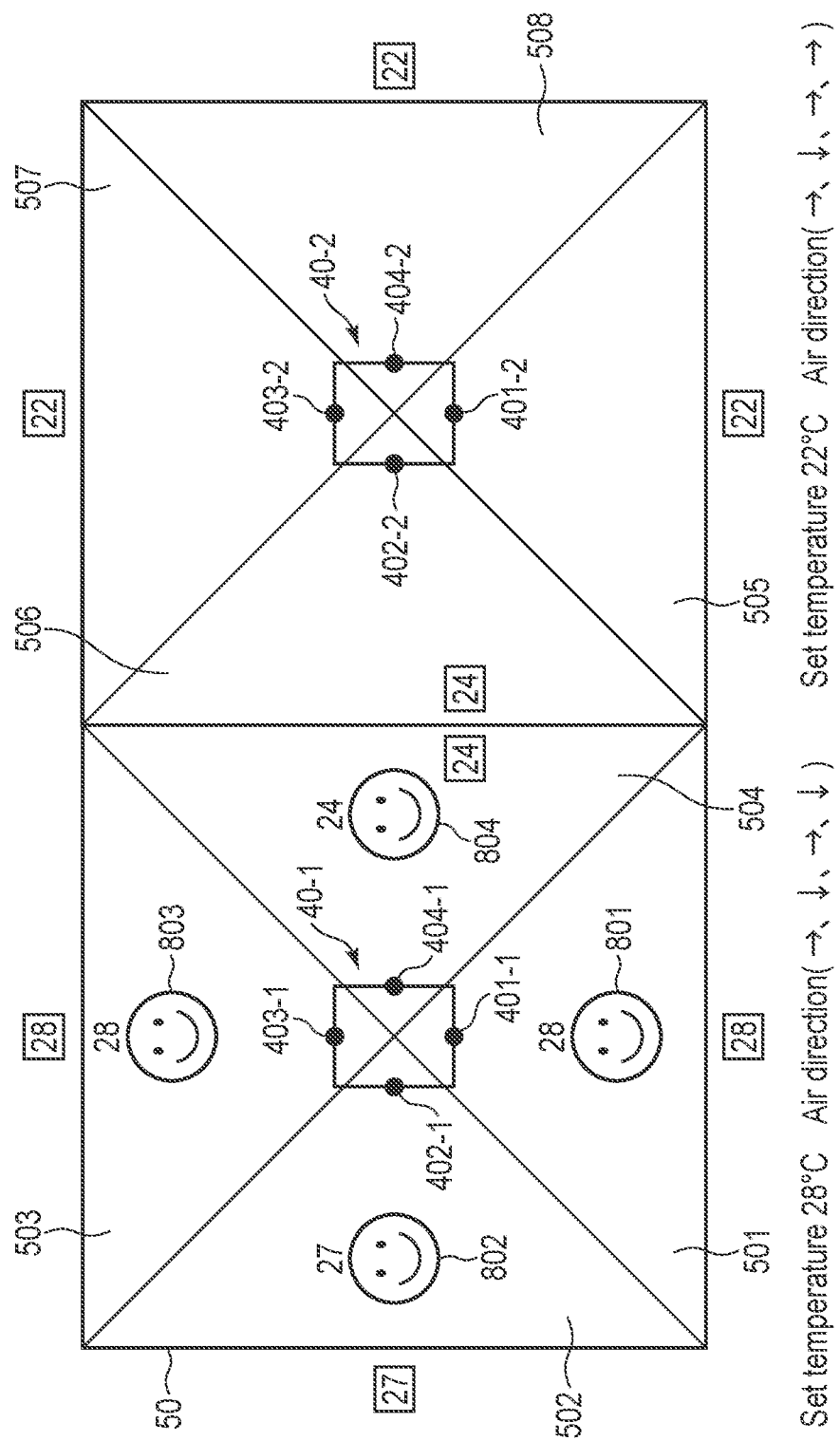
FIG. 22 is a diagram for explaining an optimization process in the present embodiment.

When such a temperature estimation model is used, as shown in FIG. 22, by optimizing the set values of the air conditioner 40-2, the estimated temperature of the indoor zone 504 to which the user 804 belongs can be lowered down to 24° C. The optimization process is the same as the optimization process described in the first embodiment except that the temperature estimation model different from the temperature estimation model described in the first embodiment described above is used when the temperature of the indoor zone 504 is estimated, and hence the detailed description thereof will be omitted here.

As described above, in the present embodiment, when the user 804 is located near the boundary between the indoor zone on the air conditioner 40-1 side and the indoor zone on the air conditioner 40-2 side, the temperature of the indoor zone 504 to which the user 804 belongs is estimated using the temperature estimation model (second temperature estimation model) different from the temperature estimation model (first temperature estimation model) used in the first embodiment described above. With this configuration, it is possible to improve the comfort level of all the users 801 to 804 in the target room 50.

According to at least one embodiment described above, it is possible to provide a control device, a terminal device, and a method capable of improving the comfort level of a plurality of users.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device for an air conditioner configured to adjust a temperature in a room, the control device being communicably connected to first and second terminal devices to be used by first and second users, the control device comprising:
   processing circuitry configured to
      receive a first personal set temperature, which is a temperature set by the first user by operating the first terminal device, the first user being located at a first position in the room;
      receive a second personal set temperature, which is a temperature set by the second user by operating the second terminal device, the second user being located at a second position, different from the first position, in the room;
      determine a set value of the air conditioner based on the first personal set temperature, the second personal set temperature, the first position, and the second position; and
      transmit the determined set value to the air conditioner so as to cause the air conditioner to adjust the temperature in the room.

2. The control device according to claim 1, wherein the air conditioner is installed in the room, and the first and second users are present in the room.

3. The control device according to claim 2, wherein the air conditioner comprises a plurality of outlets configured to blow air in a plurality of directions.

4. The control device according to claim 3, wherein the air blown from the plurality of outlets is controlled for each of the outlets.

5. The control device according to claim 4, wherein the processing circuitry is further configured to:
   divide the room into a plurality of areas based on positions of the plurality of outlets;
   acquire the first and second positions of the first and second users,
   estimate a first temperature according to a first set value of the air conditioner in a first area selected based on the first position of the first user among the plurality of divided areas;
   estimate a second temperature according to a second set value of the air conditioner in a second area selected based on the second position of the second user among the plurality of divided areas; and
   determine the set value of the air conditioner based on a difference between the first personal set temperature and the first temperature, and a difference between the second personal set temperature and the second temperature.

6. The control device according to claim 5, wherein the processing circuitry is further configured to:
   estimate the first temperature by using a first temperature estimation model prepared in advance; and
   estimate the second temperature by using the first temperature estimation model.

7. The control device according to claim 6, wherein the set value of the air conditioner determined by the processing circuitry comprises at least one of a set temperature of the air conditioner, directions of air blown from the plurality of outlets, and amounts of the air blown from the plurality of outlets.

8. The control device according to claim 6, wherein
   the air conditioner comprises first and second air conditioners, and
   the processing circuitry is further configured to determine set values of the first and second air conditioners.

9. The control device according to claim 8, wherein
   the processing circuitry is further configured to:
      divide an area around the first air conditioner into a plurality of first areas based on positions of a plurality of outlets of the first air conditioner, and divide an area around the second air conditioner into a plurality of second areas based on positions of a plurality of outlets of the second air conditioner; and
      estimate, when the first user is located near a boundary between the first area and the second area, the first temperature according to the set values of the first and second air conditioners in an area selected based on the position of the first user by using a second temperature estimation model different from the first temperature estimation model.

10. The control device according to claim 1, wherein the processing circuitry is further configured to determine the set value of the air conditioner to meet a predetermined condition.

11. The control device according to claim 1, wherein the air conditioner comprises four outlets configured to blow air in four directions, and the air blown from the four outlets is controlled for each of the outlets.

12. The control device of claim 1, further comprising a memory storing indoor map information indicating a map of the room on which positions of the air conditioner and outlets provided in the air conditioner are defined, indoor zone information indicating a plurality of indoor zones into which the room is divided based on the positions of the air conditioner and the outlets defined on the map, and a temperature estimation model for estimating a temperature in each of the plurality of indoor zones by applying a set value including a set temperature and a direction of the air blown from each of the outlets, wherein the processing circuitry is further configured to acquire the first position of the first user and the second position of the second user on the map indicated by the indoor map information;

determine a first indoor zone including the acquired first position of the first user and a second indoor zone including the acquired second position of the second user, among the plurality of indoor zones indicated by the indoor zone information; and determine the set value of the air conditioner, which allows a first difference between a temperature of the first indoor zone estimated by using the temperature estimation model and the first personal set temperature to be lowered, and which allows a second difference between a temperature of the second indoor zone estimated by using the temperature estimation model and the second personal set temperature to be lowered.

13. A control device for an air conditioner configured to adjust a temperature in a room, the control device being communicably connected to first and second terminal devices to be used by first and second users, the control device comprising:

processing circuitry configured to receive, from the first terminal device, a first personal set temperature, which is a temperature set by the first user, the first user being located at a first position in the room;

receive, from the second terminal device, a second personal set temperature, which is a temperature set by the second user, the second user being located at a second position, different from the first position, in the room;

determine a set value of the air conditioner based on the first personal set temperature, the second personal set temperature, the first position, and the second position; and transmit the determined set value to the air conditioner so as to cause the air conditioner to adjust the temperature in the room.

14. A control device for an air conditioner configured to adjust a temperature in a room, the control device being communicably connected to first and second terminal devices to be used by first and second users, the control device comprising:

a first receiver configured to receive a first personal set temperature, which is a temperature set by the first user by operating the first terminal device, the first user being located at a first position in the room;

a second receiver configured to receive a second personal set temperature, which is a temperature set by the second user by operating the second terminal device, the second user being located at a second position, different from the first position, in the room;

circuitry configured to determine a set value of the air conditioner based on the first personal set temperature, the second personal set temperature, the first position, and the second position; and a transmitter configured to transmit the determined set value to the air conditioner so as to cause the air conditioner to adjust the temperature in the room.

15. A control device for an air conditioner configured to adjust a temperature in a room, the control device being communicably connected to first and second terminal devices to be used by first and second users, the control device comprising:

a first receiver configured to receive, from the first terminal device, a first personal set temperature, which is a temperature set by the first user, the first user being located at a first position in the room;

a second receiver configured to receive, from the second terminal device, a second personal set temperature, which is a temperature set by the second user, the second user being located at a second position, different from the first position, in the room;

circuitry configured to determine a set value of the air conditioner based on the first personal set temperature, the second personal set temperature, the first position, and the second position; and a transmitter configured to transmit the determined set value to the air conditioner so as to cause the air conditioner to adjust the temperature in the room.

16. A terminal device used by a first user, the terminal device comprising:

processing circuitry configured to set a personal set temperature according to an operation of the first user on the terminal device, the first user being located at a first position in a room; and transmit the set personal set temperature to a control device, wherein the control device is configured to determine a set value of an air conditioner based on the transmitted personal set temperature and a personal set temperature of a second user different from the first user, the second user being located at a second position, different from the first position, in the room, and transmit the determined set value to the air conditioner so as to cause the air conditioner to adjust the temperature in the room.

17. The terminal device according to claim 16, wherein the air conditioner is installed in the room where the first user and the second user are present.

18. The terminal device according to claim 17, wherein the processing circuitry is further configured to set the personal set temperature based on an operation of the first user on the terminal device and a current set value of the air conditioner.

19. The terminal device according to claim 17, wherein the air conditioner comprises a plurality of outlets configured to blow air in a plurality of directions, and the air blown from the plurality of outlets is controlled for each of the outlets, the processing circuitry is further configured to display a temperature according to a current set value of the air conditioner in an area selected based on a position of the first user among a plurality of areas in which the room is divided based on positions of the plurality of outlets, and the displayed temperature is estimated by using a temperature estimation model prepared in advance.

20. The terminal device according to claim 17, wherein the air conditioner comprises a plurality of outlets configured to blow air in a plurality of directions, and the air blown from the plurality of outlets is controlled for each of the outlets, and the processing circuitry is further configured to display the personal set temperature of the second user present in an area selected based on a position of the second user among a plurality of areas in which the room is divided based on positions of the plurality of outlets.

21. The terminal device according to claim 20, wherein the processing circuitry is further configured to display a representative value of personal set temperatures of a plurality of other users when the plurality of other users are present in the area selected based on the position of the first user.

22. The terminal device according to claim 17, wherein the processing circuitry is further configured to:
    determine whether or not the first user has entered the room according to an operation of the first user on the terminal device; and
    set the personal set temperature when it is determined that the first user has entered the room.

23. The terminal device according to claim 22, wherein the processing circuitry is further configured to determine whether or not the first user has left the room according to an operation of the first user on the terminal device, and when it is determined that the first user has left the room, the terminal device notifies the control device that the first user has left the room.

24. A terminal device used by a first user, the terminal device comprising:
    an interface configured to set a personal set temperature according to an operation of the first user on the terminal device, the first user being located at a first position in a room; and
    a transmitter configured to transmit the set personal set temperature to a control device,
    wherein the control device determines a set value of an air conditioner based on the transmitted personal set temperature and a personal set temperature of a second user different from the first user, the second user being located at a second position, different from the first position, in the room, and transmit the determined set value to the air conditioner so as to cause the air conditioner to adjust the temperature in the room.

25. A method for controlling an air conditioner configured to adjust a temperature in a room, the method comprising:
    receiving a first personal set temperature, which is a temperature set by a first user, the first user being located at a first position in the room;
    receiving a second personal set temperature, which is a temperature set by a second user, the second user being located at a second position, different from the first position, in the room;
    determining a set value of an air conditioner based on the first personal set temperature, the second personal set temperature, the first position, and the second position; and
    transmitting the determined set value to the air conditioner so as to cause the air conditioner to adjust the temperature in the room.

* * * * *